(12) United States Patent
von Kries et al.

(10) Patent No.: US 11,009,263 B2
(45) Date of Patent: May 18, 2021

(54) SYSTEMS AND METHODS FOR ALTERING ROTATION OF A SOLAR ROTATIONAL MANUFACTURING SYSTEM

(71) Applicants: Karl von Kries, Pismo Beach, CA (US); Nicholas Peter Deick, Nipomo, CA (US)

(72) Inventors: Karl von Kries, Pismo Beach, CA (US); Nicholas Peter Deick, Nipomo, CA (US)

( * ) Notice: Subject to any disclaimer, the term of this patent is extended or adjusted under 35 U.S.C. 154(b) by 0 days.

(21) Appl. No.: 16/285,127

(22) Filed: Feb. 25, 2019

(65) Prior Publication Data
US 2020/0269474 A1 Aug. 27, 2020

(51) Int. Cl.
*F24S 30/40* (2018.01)
*B29C 41/52* (2006.01)
(Continued)

(52) U.S. Cl.
CPC .............. *F24S 30/40* (2018.05); *B29C 41/04* (2013.01); *B29C 41/46* (2013.01); *B29C 41/52* (2013.01);
(Continued)

(58) Field of Classification Search
CPC ..... Y02E 10/41; Y02E 10/44; B29C 35/0288; B29C 39/38; B29C 41/04; B29C 41/46;
(Continued)

(56) References Cited
U.S. PATENT DOCUMENTS 2,793,018 A 5/1957 Felix
3,998,206 A 12/1976 Jahn
(Continued)

FOREIGN PATENT DOCUMENTS

WO WO-2013044849 A1 * 4/2013 ............ G01B 11/00
WO 2013126607 8/2013
(Continued)

OTHER PUBLICATIONS

Stoynow, A feasibility study into joining of Engineering thermoplastics utilizing concentrated beam solar radiation, Renewable Energy, 2000, 336-361, Pergamon.
(Continued)

*Primary Examiner* — Crystal J Barnes-Bullock
(74) *Attorney, Agent, or Firm* — The Law Offices of Eric W. Peterson

(57) ABSTRACT

A solar rotational manufacturing system having a monitoring device, a controller, a heliostat having a heliostat controller, a rotational apparatus having a rotational controller, and a mold, wherein the monitoring device is configured to collect actual data regarding a characteristic of the solar rotational heating system and transmit actual data to the controller, the controller is configured to receive a reference parameter, an affecting parameter, and linking instructions, receive actual data from the monitoring device, compare actual data with a reference parameter, determine an affecting parameter to alter, and transmit alteration instructions to the heliostat controller and/or the rotational controller, the heliostat controller is configured to receive the alteration instructions from the controller and execute the alteration instructions, and the rotational controller is configured to receive the alteration instructions from the controller and execute the alteration instructions.

14 Claims, 19 Drawing Sheets

(51) Int. Cl.

| | | |
|---|---|---|
| *B29C 41/04* | (2006.01) | |
| *G05B 19/418* | (2006.01) | |
| *B29C 41/46* | (2006.01) | |
| *F24S 40/52* | (2018.01) | |
| *F24S 50/40* | (2018.01) | |
| *F24S 50/80* | (2018.01) | |
| *F24S 20/20* | (2018.01) | |
| *F24S 50/20* | (2018.01) | |

(52) U.S. Cl.
CPC ............. *F24S 40/52* (2018.05); *F24S 50/40* (2018.05); *F24S 50/80* (2018.05); *G05B 19/41845* (2013.01); *F24S 2020/23* (2018.05); *F24S 2050/25* (2018.05); *G05B 2219/40516* (2013.01); *Y02E 10/44* (2013.01)

(58) Field of Classification Search
CPC ...... G01S 3/7803; G01S 3/7861; G01S 13/06; F24S 20/20; F24S 20/30; F24S 2020/23; F24S 23/00; F24S 30/40; F24S 40/52; F24S 50/00; F24S 50/20; F24S 50/40; F24S 2050/25; F24S 60/00; F24S 90/00; Y02B 40/18; G05B 15/02; G05D 3/105; Y02P 20/134

See application file for complete search history.

(56) References Cited

U.S. PATENT DOCUMENTS

| | | | |
|---|---|---|---|
| 4,033,676 A | 7/1977 | Brantley | |
| 4,137,987 A | 2/1979 | Moore | |
| 4,139,286 A * | 2/1979 | Hein | F24S 23/79 353/3 |
| 4,172,443 A * | 10/1979 | Sommer | G01S 3/7861 126/680 |
| 4,195,620 A | 4/1980 | Rust | |
| 4,265,223 A * | 5/1981 | Miserlis | F22B 1/006 126/592 |
| 4,352,112 A | 9/1982 | Leonardt | |
| 5,016,998 A * | 5/1991 | Butler | F24S 23/715 359/847 |
| 5,100,589 A | 3/1992 | Ticknor | |
| 5,128,115 A | 7/1992 | Glatzmaier | |
| 5,204,784 A | 4/1993 | Spinhirne | |
| 5,255,666 A | 10/1993 | Curchod | |
| 5,404,868 A * | 4/1995 | Sankrithi | F24S 30/48 126/604 |
| 5,574,472 A | 11/1996 | Robinson | |
| 5,746,278 A | 4/1998 | La Fiandra | |
| 6,218,458 B1 | 4/2001 | Vidaurre | |
| 6,776,154 B2 * | 8/2004 | Yogev | F24S 20/20 126/639 |
| 6,810,950 B1 | 11/2004 | Manze, III | |
| 7,081,219 B2 | 7/2006 | Stewart | |
| 7,229,178 B1 | 6/2007 | Headley | |
| 7,994,459 B2 * | 8/2011 | Zavodny | G01S 3/7803 250/203.4 |
| 8,001,960 B2 | 8/2011 | Gilon | |
| 8,063,349 B2 | 11/2011 | Huss | |
| 8,256,219 B2 * | 9/2012 | Hinders | F28D 9/0006 60/641.2 |
| 8,582,092 B1 * | 11/2013 | Yellowhair | G01B 11/26 356/138 |
| 8,662,877 B2 * | 3/2014 | von Kries | B29C 39/38 425/174.4 |
| 8,739,775 B2 * | 6/2014 | Kroyzer | G05B 13/028 126/601 |
| 8,801,188 B2 * | 8/2014 | Hoffschmidt | G01S 13/06 353/3 |
| 8,931,475 B2 * | 1/2015 | Gilon | F24S 23/70 126/572 |
| 9,003,795 B2 * | 4/2015 | Katz | F24S 23/77 60/641.8 |
| 9,034,238 B2 * | 5/2015 | von Kries | B29C 39/38 264/402 |
| 9,222,702 B2 * | 12/2015 | Goldberg | F24S 50/20 |
| 9,575,222 B2 | 2/2017 | von Kries | |
| 9,605,661 B2 * | 3/2017 | Aga | F01K 3/12 |
| 9,903,613 B2 * | 2/2018 | Shinozaki | F03G 6/067 |
| 2001/0050449 A1 | 12/2001 | Baxter | |
| 2007/0033828 A1 | 2/2007 | Hartkop | |
| 2008/0008345 A1 | 4/2008 | Kimura | |
| 2009/0165781 A1 | 7/2009 | Moore | |
| 2009/0178668 A1 | 7/2009 | Boggavarapu | |
| 2009/0313886 A1 * | 12/2009 | Hinman | C01B 3/042 44/302 |
| 2010/0006087 A1 * | 1/2010 | Gilon | F24S 23/70 126/572 |
| 2010/0139644 A1 * | 6/2010 | Schwarzbach | F24S 50/20 126/573 |
| 2010/0269817 A1 | 10/2010 | Kelly | |
| 2011/0000543 A1 | 1/2011 | Errico | |
| 2011/0067688 A1 * | 3/2011 | Reif | F24S 60/00 126/600 |
| 2011/0114078 A1 | 5/2011 | Fargo | |
| 2012/0104658 A1 * | 5/2012 | von Kries | B29C 39/38 425/135 |
| 2013/0239952 A1 * | 9/2013 | Kroyzer | F24S 20/20 126/714 |
| 2014/0008579 A1 * | 1/2014 | McNaughton | C01B 3/26 252/373 |
| 2014/0186493 A1 | 7/2014 | Bair | |
| 2014/0023080 A1 | 8/2014 | von Kries | |
| 2014/0230807 A1 * | 8/2014 | von Kries | B29D 11/00596 126/681 |
| 2014/0251315 A1 * | 9/2014 | Patwardhan | F24S 50/20 126/714 |
| 2014/0293466 A1 | 10/2014 | von Kries | |
| 2018/0299264 A1 * | 10/2018 | Hines | G01B 11/26 |
| 2019/0056148 A1 * | 2/2019 | Shinozaki | F24S 50/20 |

FOREIGN PATENT DOCUMENTS

| | | |
|---|---|---|
| WO | 2014037630 A1 | 3/2014 |
| WO | 2015195850 | 12/2015 |

OTHER PUBLICATIONS

International Search Report and Written Opinion dated Apr. 1, 2020, in International Application No. PCT/US2020/019693.

* cited by examiner

SYSTEMS AND METHODS FOR ALTERING ROTATION OF A SOLAR ROTATIONAL MANUFACTURING SYSTEM

BACKGROUND

The present invention relates generally to plastic manufacturing processes, and more particularly, to methods and systems for solar thermal molding of plastic.

Manufacturing process for plastic products typically includes heating various forms of plastic (e.g., pellets, powders, sheets, etc.) and forming the plastic into the desired shape. One common form of plastic molding is rotational molding. Rotational molding includes a hollow mold that can rotate in all three axis (X, Y, Z axis). The hollow mold is typically formed from a metal or similarly heat-conductive material. A quantity of plastic powder is placed inside the hollow mold. The hollow mold is then moved into an oven where the heat source substantially surrounds the hollow mold. The hollow mold is then rotated and heated in the oven.

As the hollow mold is rotated and heated in the oven, the plastic powder continually falls to the bottom of the inner surface of the hollow mold. The heated hollow mold heats the plastic powder on the bottom inner layer of the hollow mold. The melted plastic powder bonds together (e.g., sinters) to form a complete plastic layer in the bottom inner surface of the hollow mold. Continually rotating the mold forms a plastic layer on all inner surfaces of the hollow mold.

The hollow mold can be removed from the oven once the complete plastic layer is formed on the inner surface of the hollow mold. The hollow mold is then allowed to cool and then opened and the molded plastic product removed from the hollow mold.

Typical products formed in a rotational molding system are tanks, boats, shipping containers and other shapes.

In rotational molding systems, products formed can be inadvertently heated to a temperature that is greater than or less than the desired temperature resulting in a formed product that is unsuitable for use. In view of the foregoing, there is a need to ascertain the state or condition of the formed product during the manufacturing process so that the temperature of the formed product can be altered.

SUMMARY

The present disclosure pertains to a solar rotational manufacturing system having a monitoring device, a controller, a heliostat having a heliostat controller, a rotational apparatus having a rotational controller, and a mold, wherein the monitoring device is configured to collect actual data regarding a characteristic of the solar rotational heating system and transmit actual data to the controller, the controller is configured to receive a reference parameter, an affecting parameter, and linking instructions, receive actual data from the monitoring device, compare actual data with a reference parameter, determine an affecting parameter to alter, and transmit alteration instructions to the heliostat controller and/or the rotational controller, the heliostat controller is configured to receive the alteration instructions from the controller and execute the alteration instructions, and the rotational controller is configured to receive the alteration instructions from the controller and execute the alteration instructions.

In one aspect of the disclosure, the controller is configured to determine an affecting parameter to alter by identifying the affecting parameter linked to the reference parameter. In another aspect of the disclosure, the controller is configured to transmit continuation instructions to the heliostat controller and/or the rotational controller. In another aspect of the disclosure, the monitoring device is selected from the group consisting of a positional sensor, a temperature sensor, a viscosity sensor, a pressure sensor, or a rotational velocity sensor. In another aspect of the disclosure, the reference parameter comprises a target range and an alteration range.

Another aspect of the disclosure is a method for manufacturing a product, the method having by a monitoring device: collecting actual data regarding a characteristic of the solar rotational heating system and transmitting actual data to the controller, by a controller: receiving a reference parameter, an affecting parameter, and linking instructions, receiving actual data from the monitoring device, comparing actual data with a reference parameter, determining an affecting parameter to alter, and transmitting alteration instructions to the heliostat controller and/or the rotational controller, by a heliostat controller: receiving the alteration instructions from the controller and executing the alteration instructions, and by a rotational controller: receiving the alteration instructions from the controller and executing the alteration instructions.

In another aspect of the disclosure, the method further having, by the controller, determining an affecting parameter to alter by identifying the affecting parameter linked to the reference parameter. In another aspect of the disclosure, the method further having, by the controller, transmitting continuation instructions to the heliostat controller and/or the rotational controller. In another aspect of the disclosure, the method further having wherein the monitoring device is selected from the group consisting of a positional sensor, a temperature sensor, a viscosity sensor, a pressure sensor, or a rotational velocity sensor. In another aspect of the disclosure, the method further having wherein the reference parameter comprises a target range and an alteration range.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to a solar rotational manufacturing system 100 and methods for affecting a characteristic of a solar rotational manufacturing system 100. In general, the systems 100 and methods affect the manufacturing process of a product created by a solar rotational manufacturing system 100. In one embodiment, the systems 100 and methods are configured to affect the amount of heat received by a heated object 114 or the amount of time the heated object 114 receives heat by altering a characteristic of a component of the solar rotational manufacturing system 100.

Figure 1A:
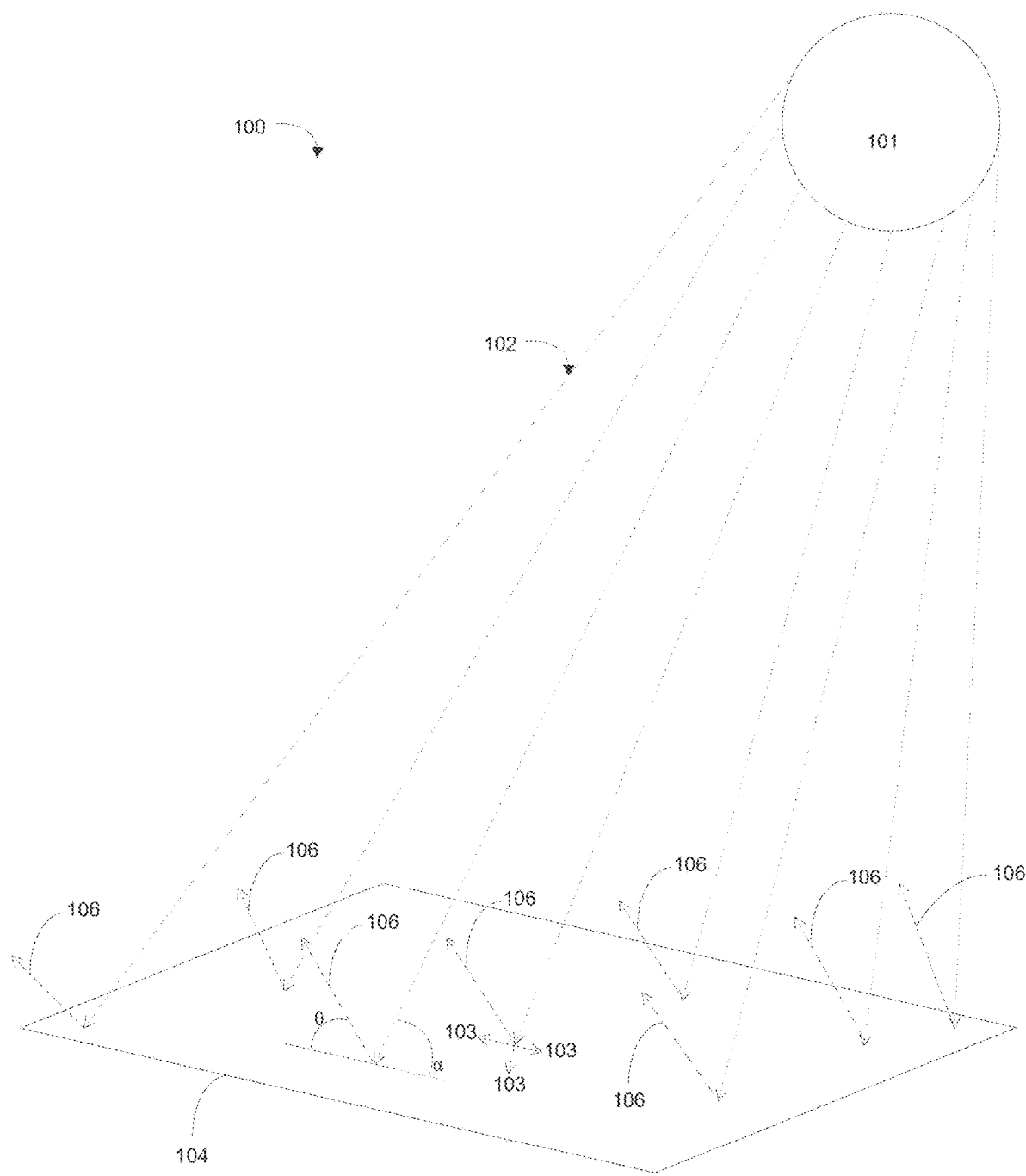
FIG. 1A is a schematic diagram of a flat surface, in accordance with one embodiment.

FIGS. 5a-j are of a functional block diagram illustrating a heating environment 500, in accordance with an embodiment of the present invention. In one embodiment, the solar rotational manufacturing system 100 can have a heliostat 120 having a flat surface 104. FIG. 1A is a schematic diagram of a flat surface 104, in accordance with one embodiment of the present invention. Radiant solar energy 102 from energy source 101, for example, without limitation, the sun, impinges on the flat surface 104. At least a first portion 106 of the radiant solar energy 102 is reflected off of the flat surface 104. The flat surface 104 can also absorb a second portion 103 of the radiant solar energy 102. The relative quantities of the reflected first portion of the radiant energy 106 and the absorbed second portion of the radiant energy 103 is determined by the types of materials in the flat surface 104 and the surface finish (e.g., reflectivity) of the flat surface 104. Radiant solar energy 102 can be reflected from a reflective surface (e.g., mirror or other reflective surface such as a polished surface).

The reflected first portion of the radiant energy 106 is reflected off of the flat surface 104 at an angle $\Theta$ corresponding to the incident angle $\Theta$ of the radiant solar energy 102. As a result the reflected first portion 106 is reflected off of the flat surface 104 in a dispersed fashion as the reflected first portion 106 is reflected in different angles corresponding to the different incident angles.

Figure 1B:
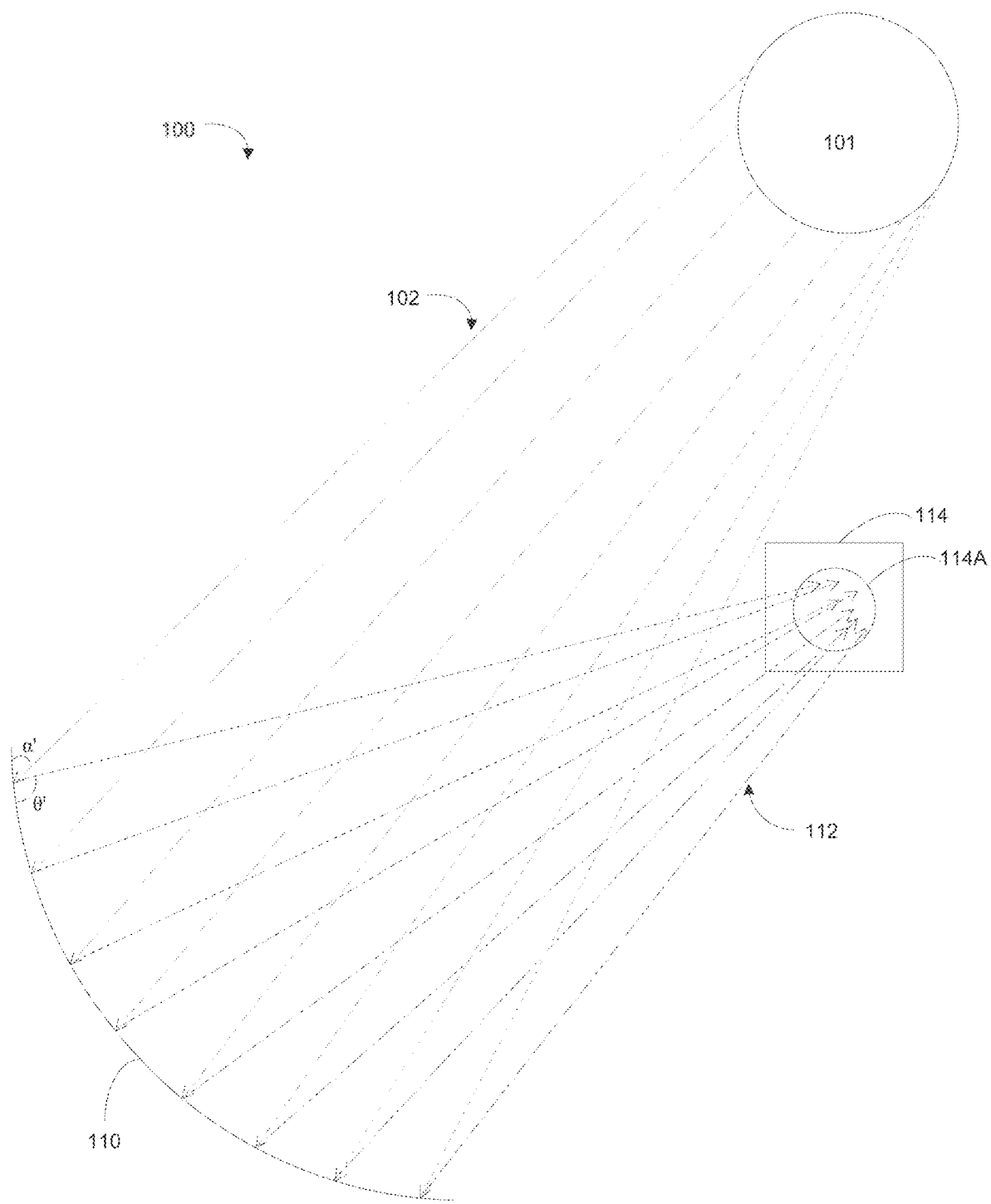
FIG. 1B is a schematic of a single curved reflective surface, in accordance with one embodiment.

As shown in FIG. 1B, a curved reflective surface 110 can focus or concentrate the reflected radiant energy 112. The reflected radiant energy 112 is reflected off of the curved surface 110 at an angle $\Theta'$ corresponding to the incident angle $\Theta'$ of the radiant solar energy 102 at the corresponding point on the curved surface. As a result, the reflected radiant energy 112 from the entire area of the curved surface 110 can be directed onto a selected or even a smaller area or focal point 114A on a heated object 114. The focal point 114A on the heated object 114 can have an area less than the area of the curved surface 110, thus the curved surface can concentrate the reflected radiant energy 112 on the focal point 114A on the heated object 114.

Figure 1C:
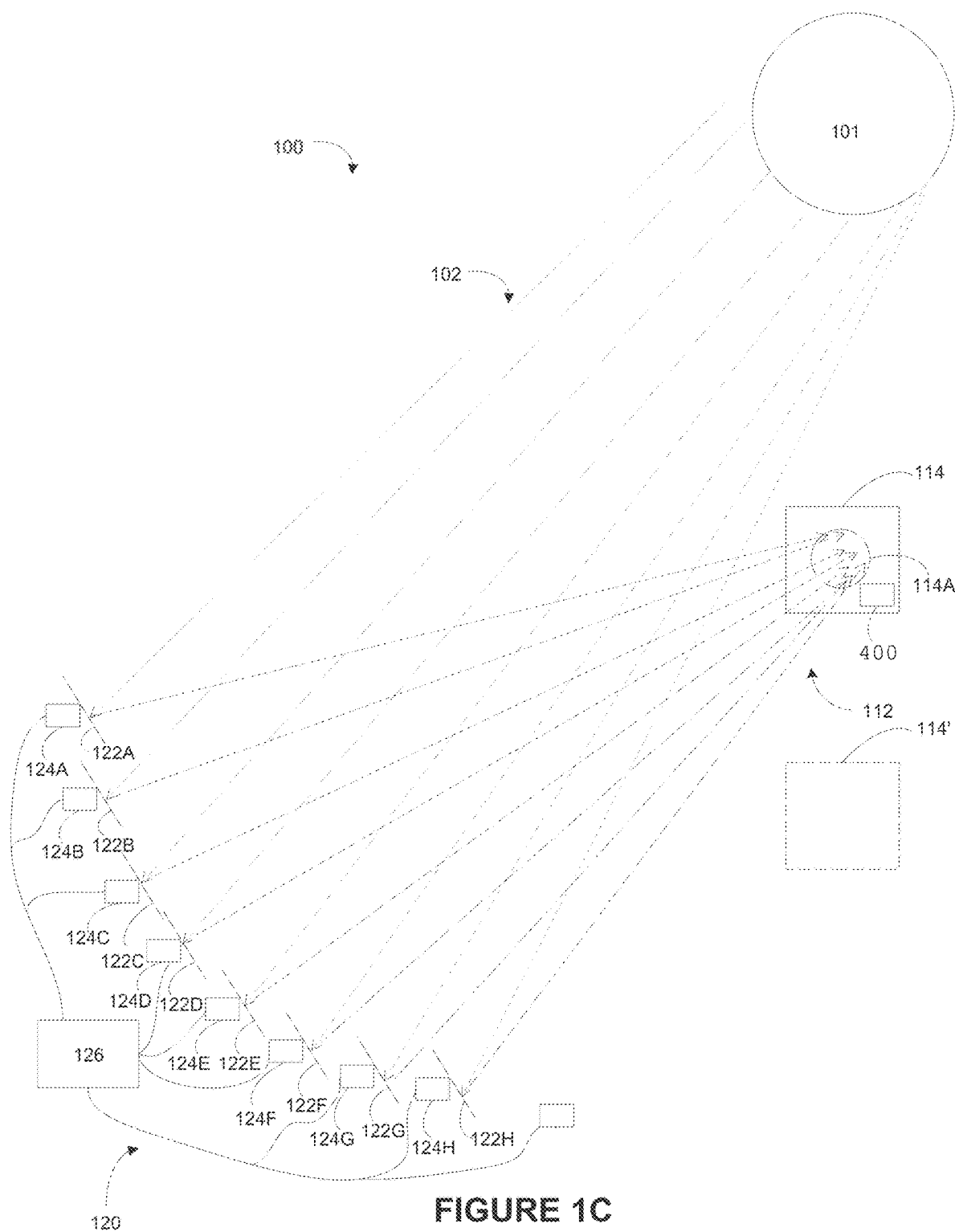
FIG. 1C is a schematic diagram of a heliostat system, in accordance with one embodiment.
Figure 1D:
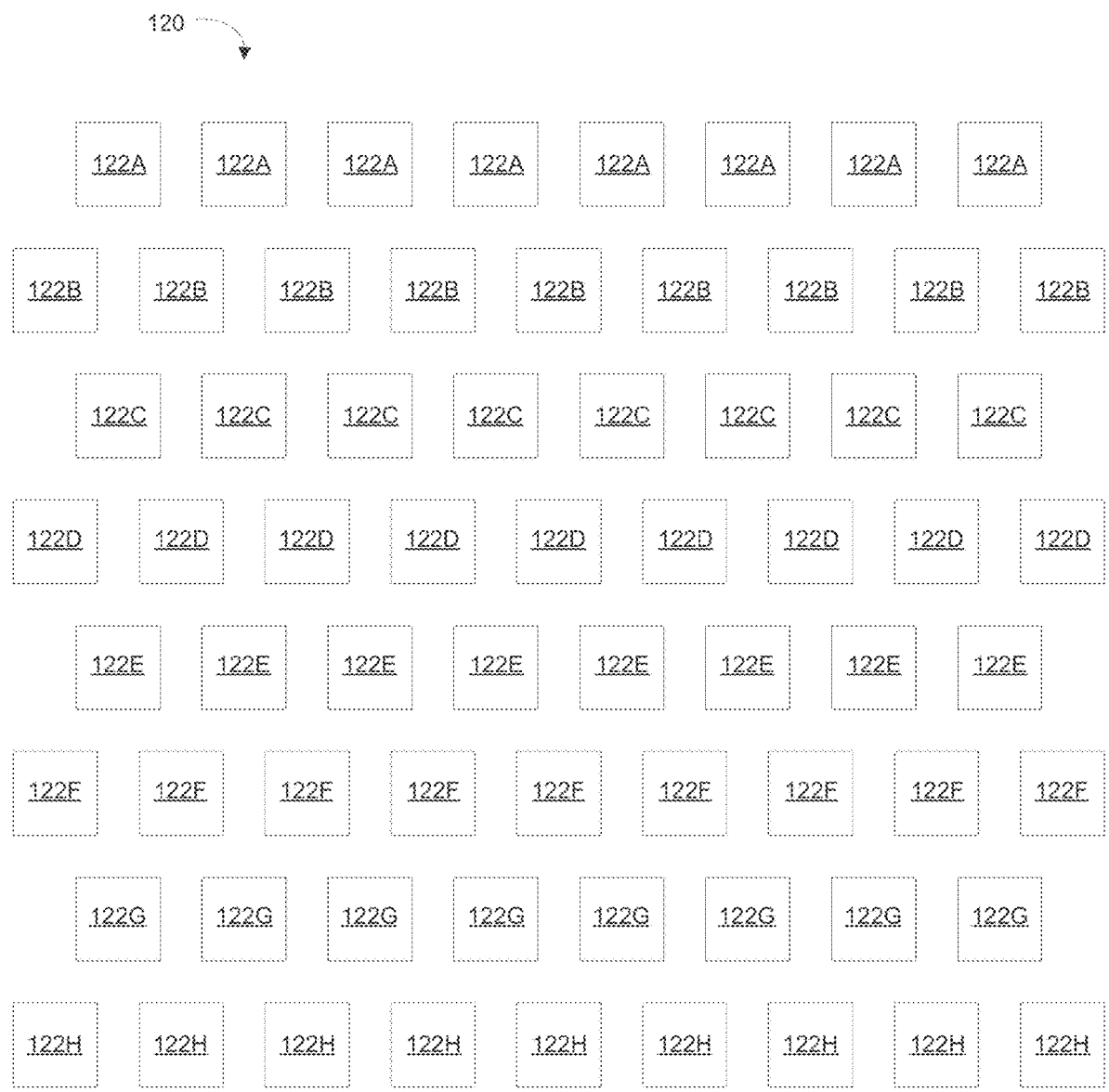
FIG. 1D is a schematic diagram of an array of reflective surfaces in a heliostat system, in accordance with one embodiment.
Figure 4:
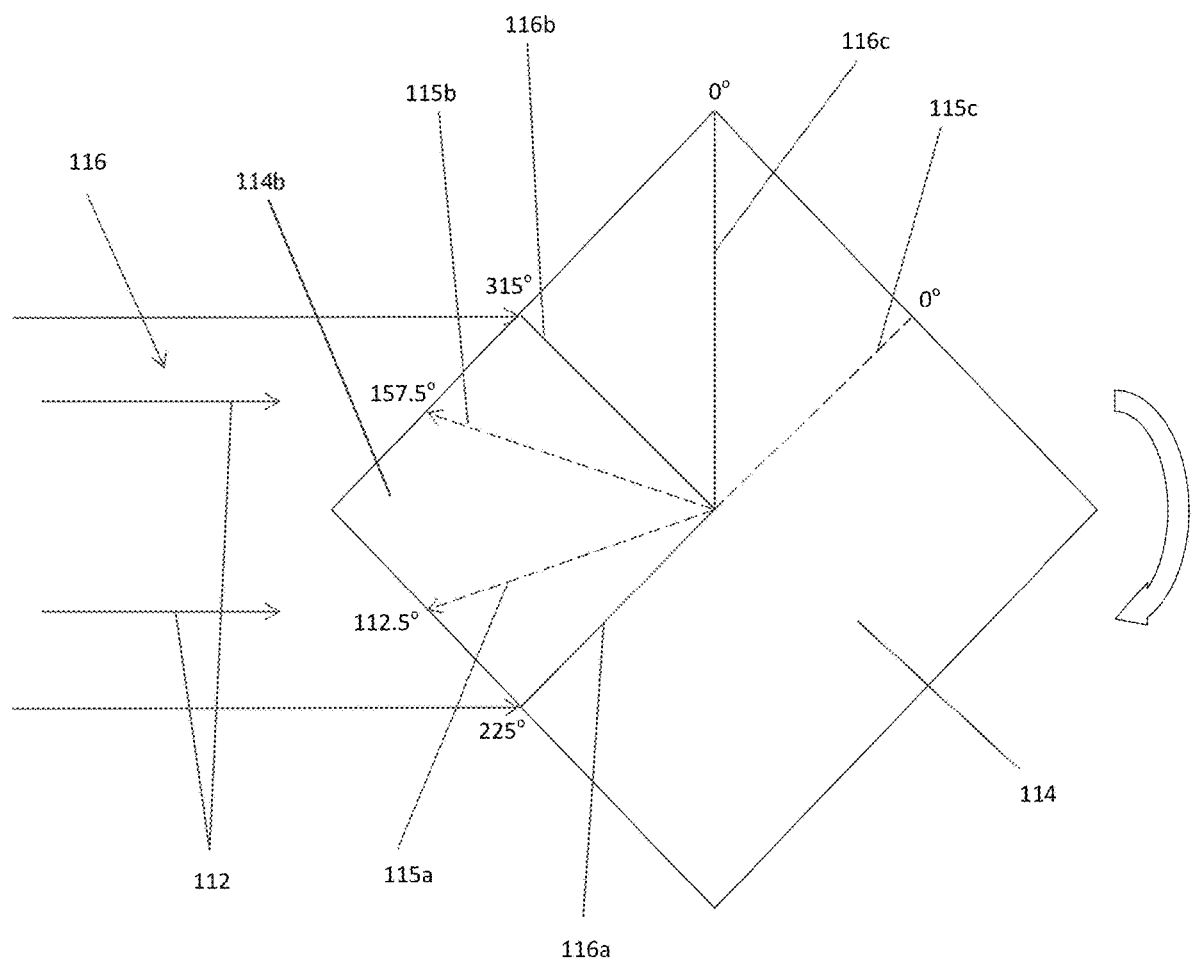
FIG. 4 is a schematic diagram of an array of reflective surfaces in a heliostat system, in accordance with one embodiment.
Figure 5A:
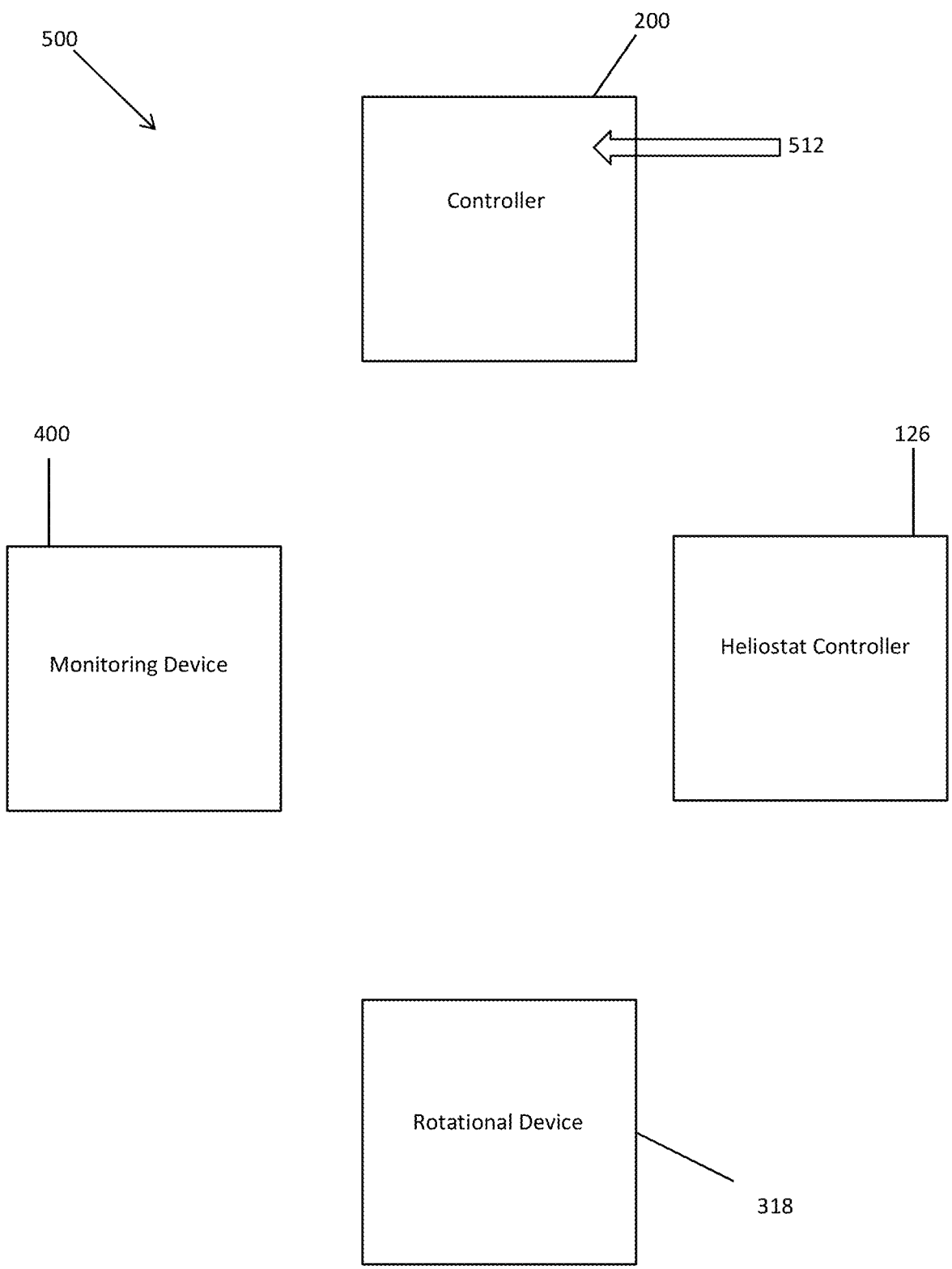
FIG. 5a is a block diagram of a system, in accordance with one embodiment.
Figure 5B:
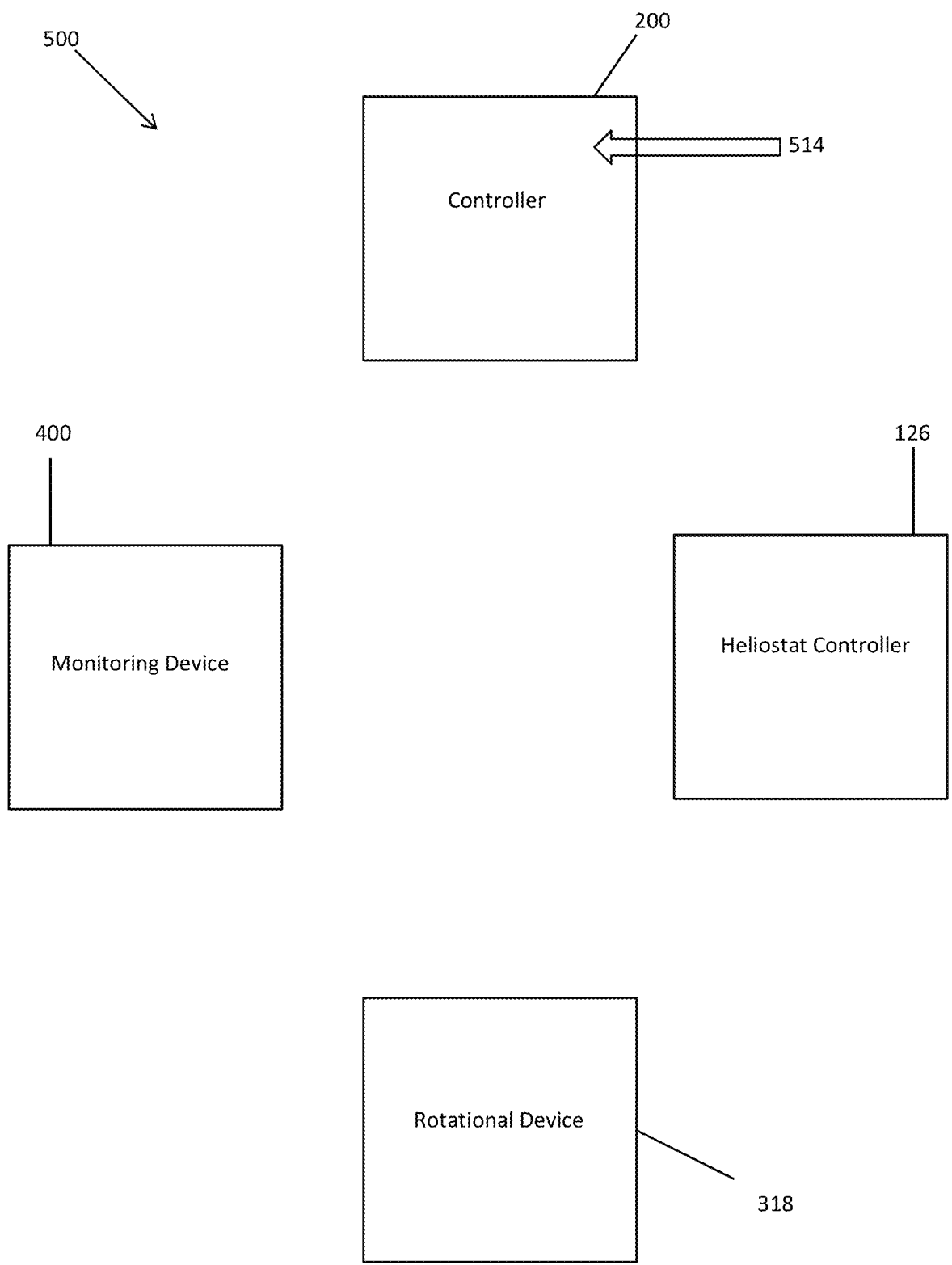
FIG. 5b is a block diagram of a system, in accordance with one embodiment.
Figure 5C:
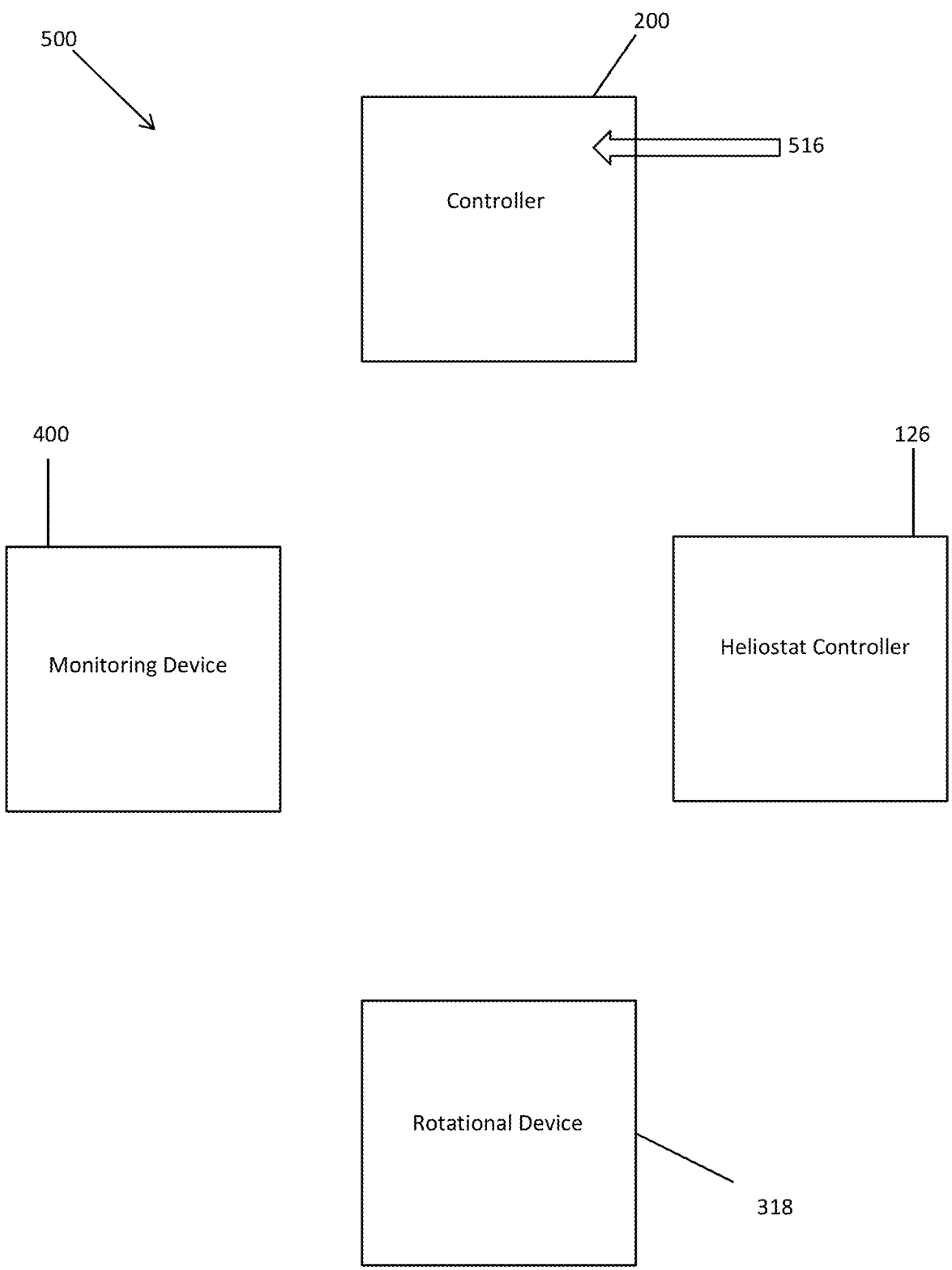
FIG. 5c is a block diagram of a system, in accordance with one embodiment.
Figure 5D:
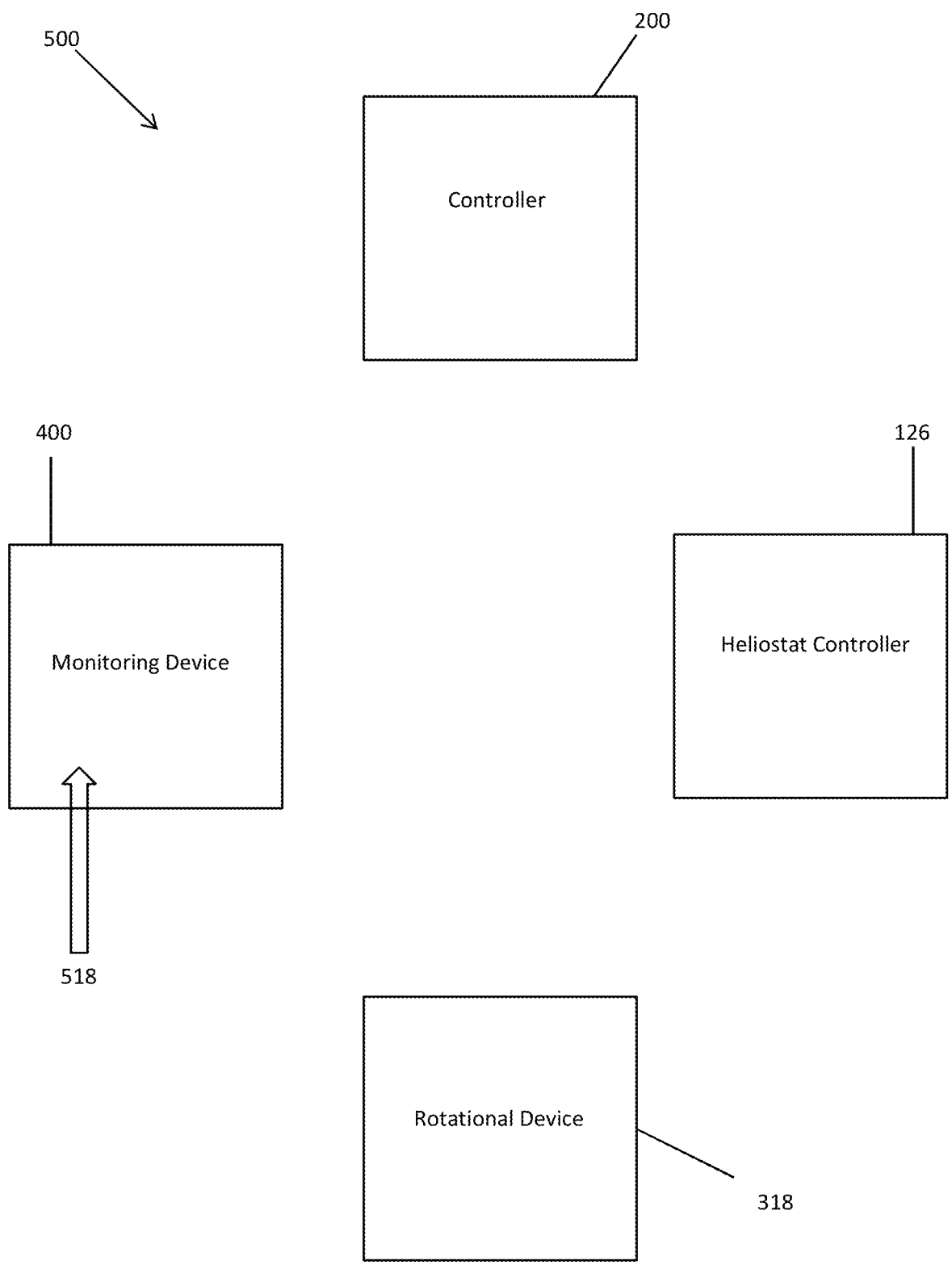
FIG. 5d is a block diagram of a system, in accordance with one embodiment.
Figure 5E:
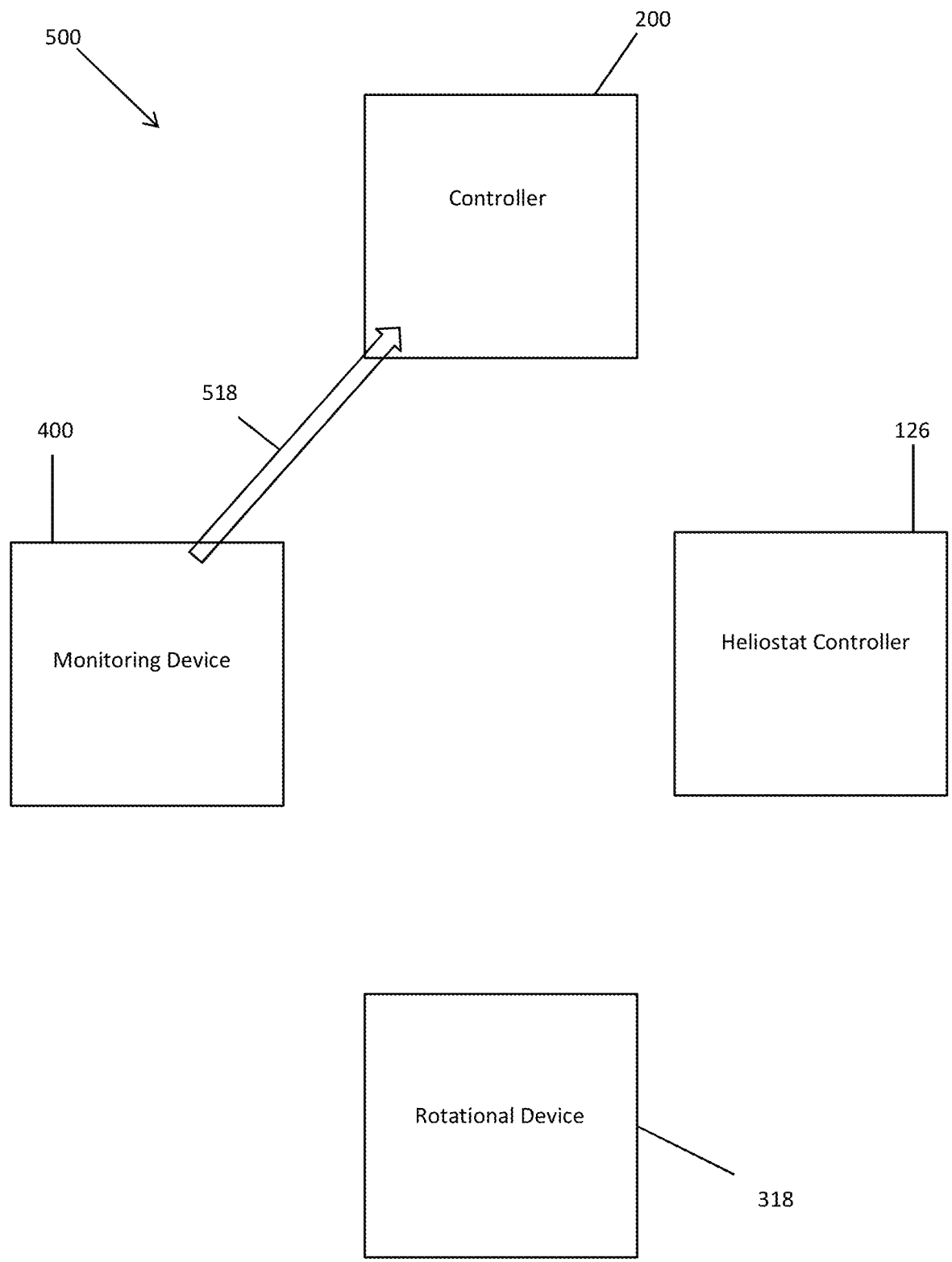
FIG. 5e is a block diagram of a system, in accordance with one embodiment.
Figure 5F:
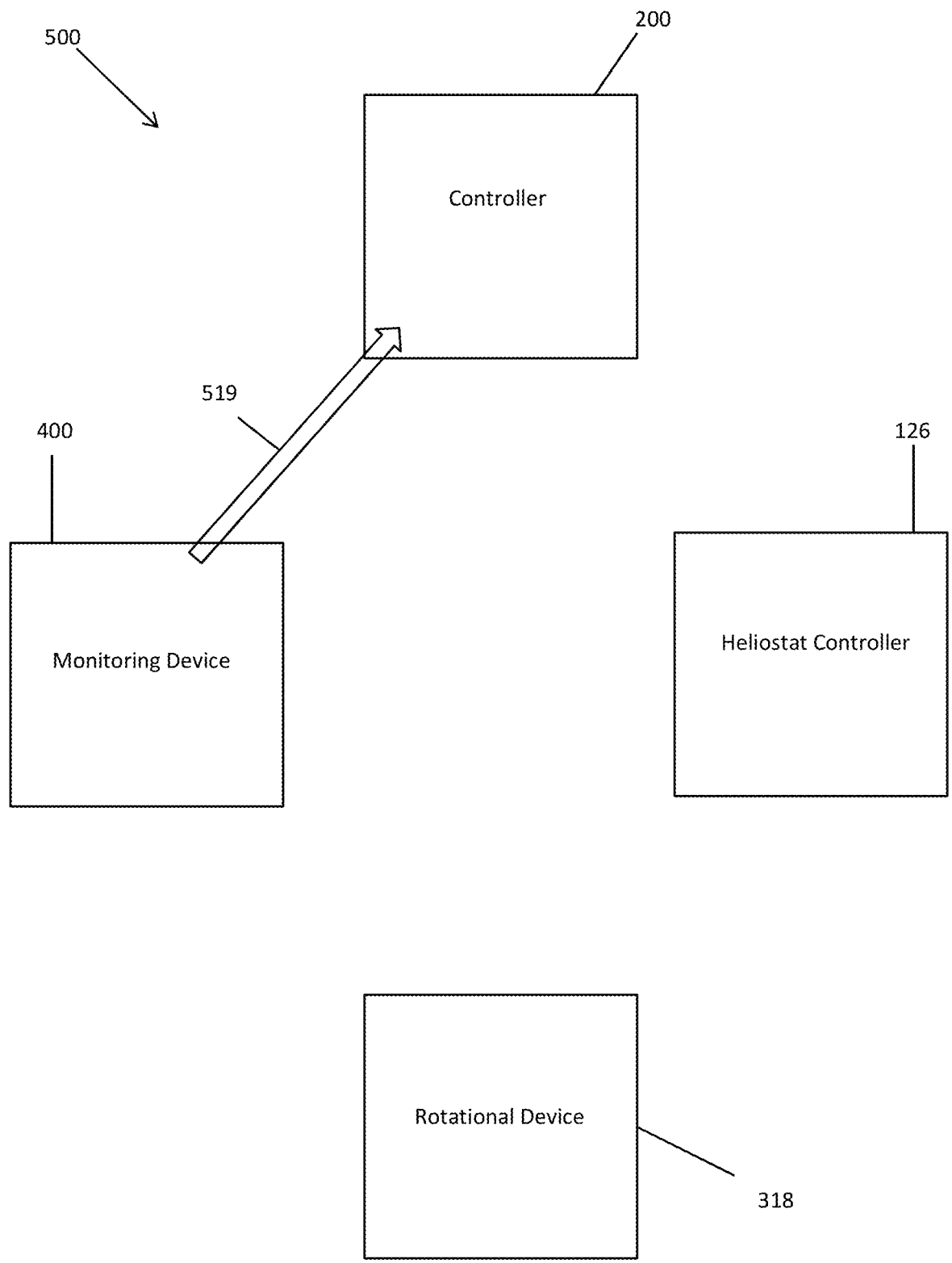
FIG. 5f is a block diagram of a system, in accordance with one embodiment.
Figure 5G:
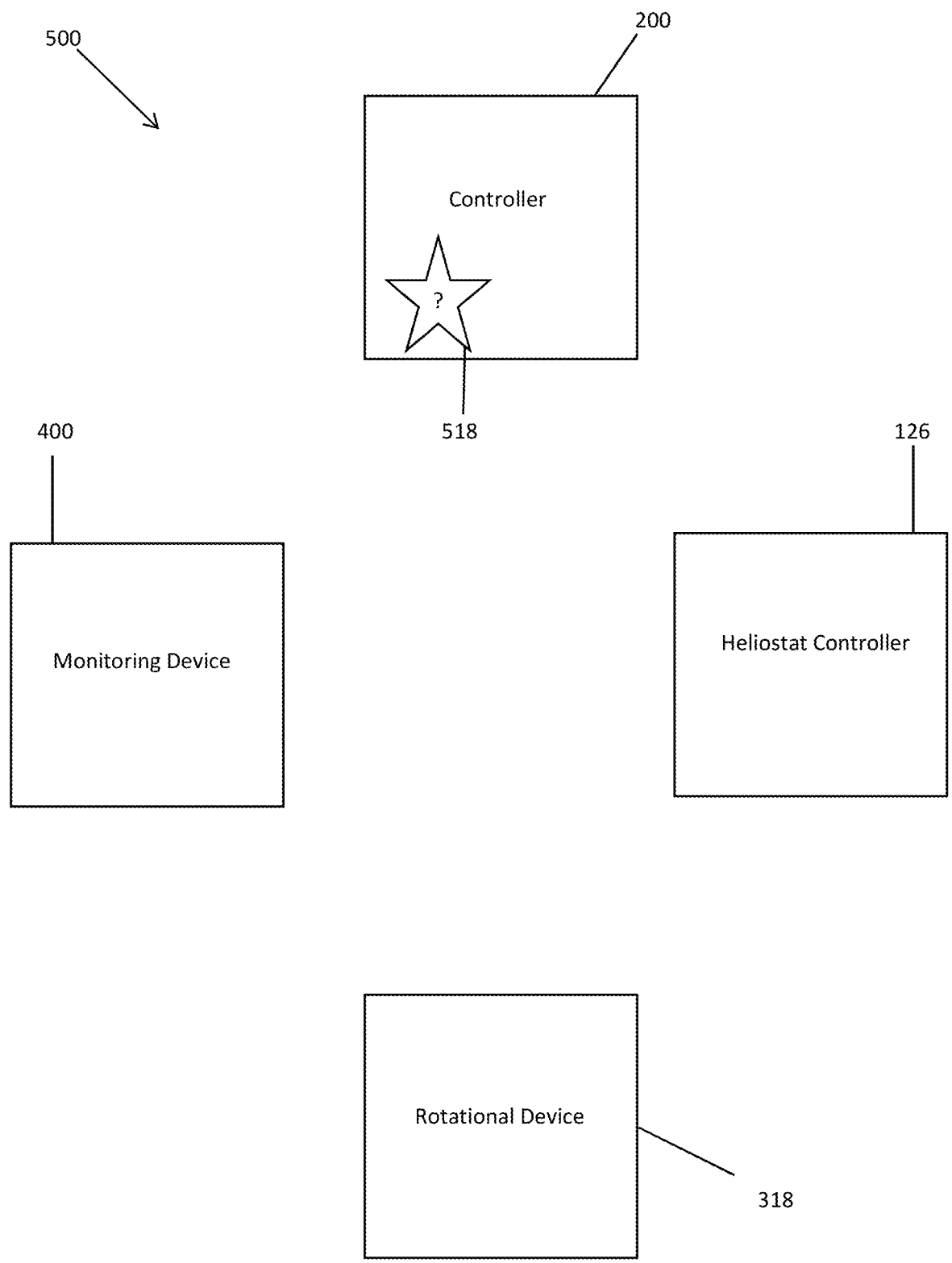
FIG. 5g is a block diagram of a system, in accordance with one embodiment.
Figure 5H:
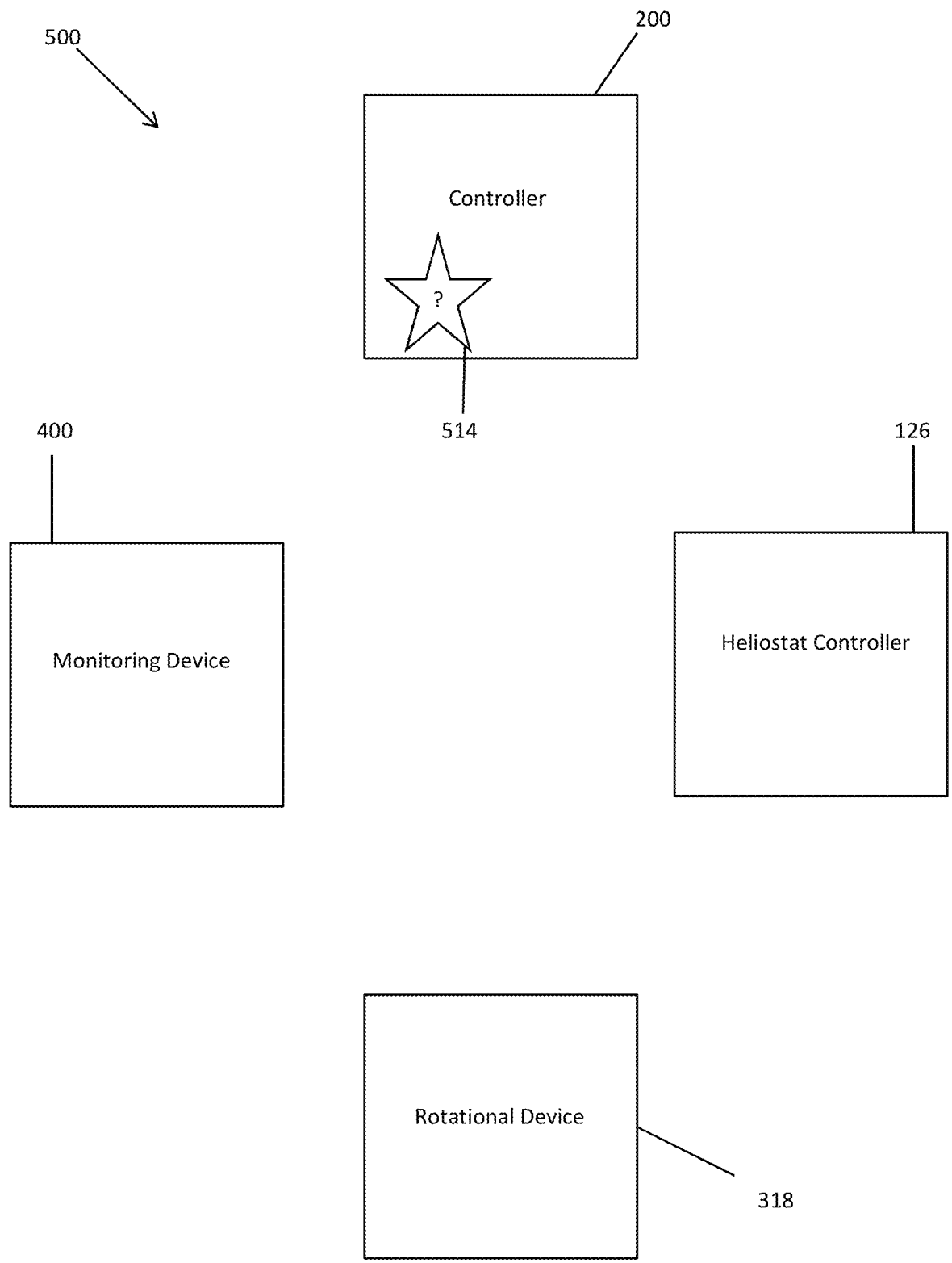
FIG. 5h is a block diagram of a system, in accordance with one embodiment.
Figure 5I:
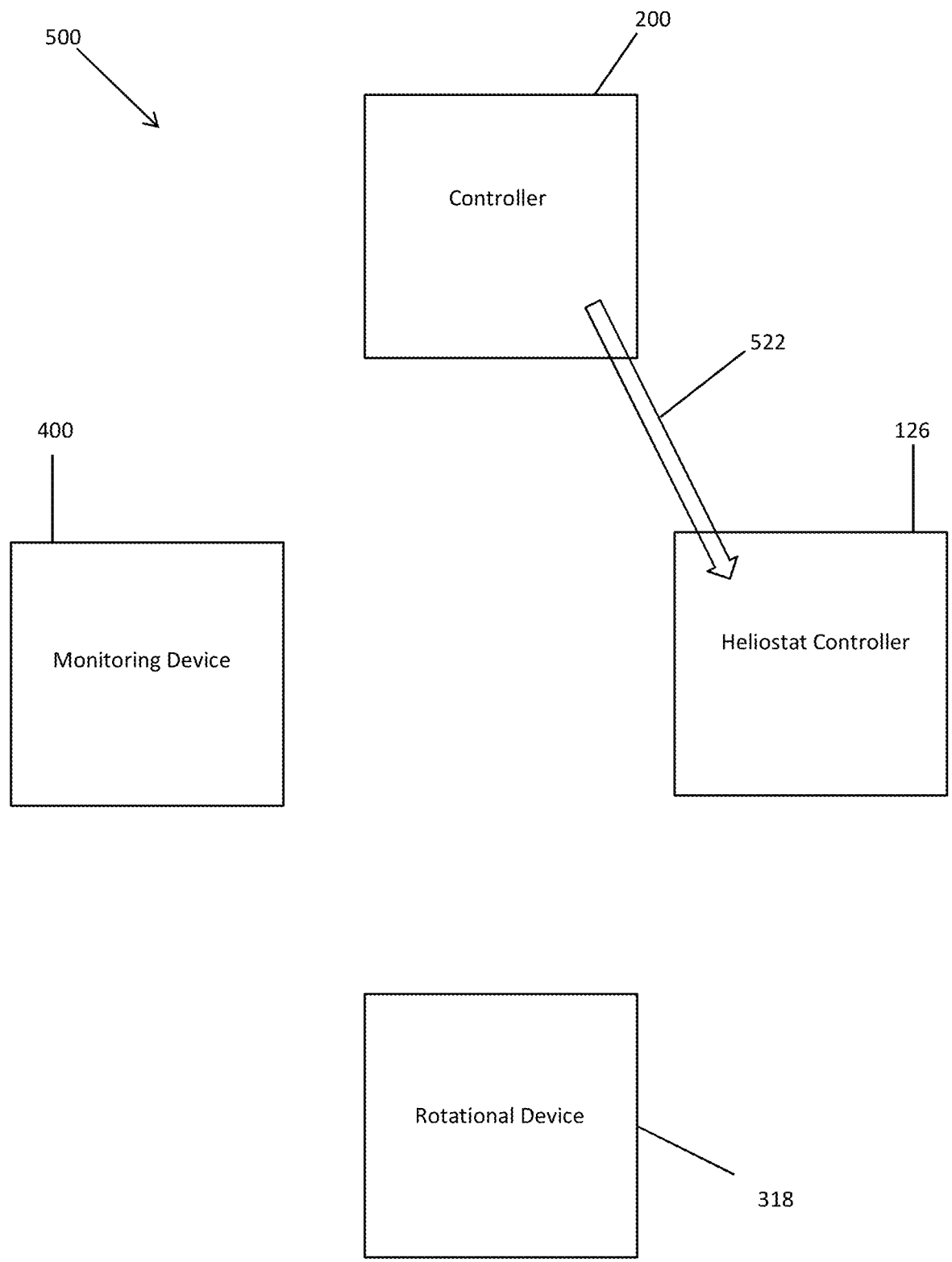
FIG. 5i is a block diagram of a system, in accordance with one embodiment.
Figure 5J:
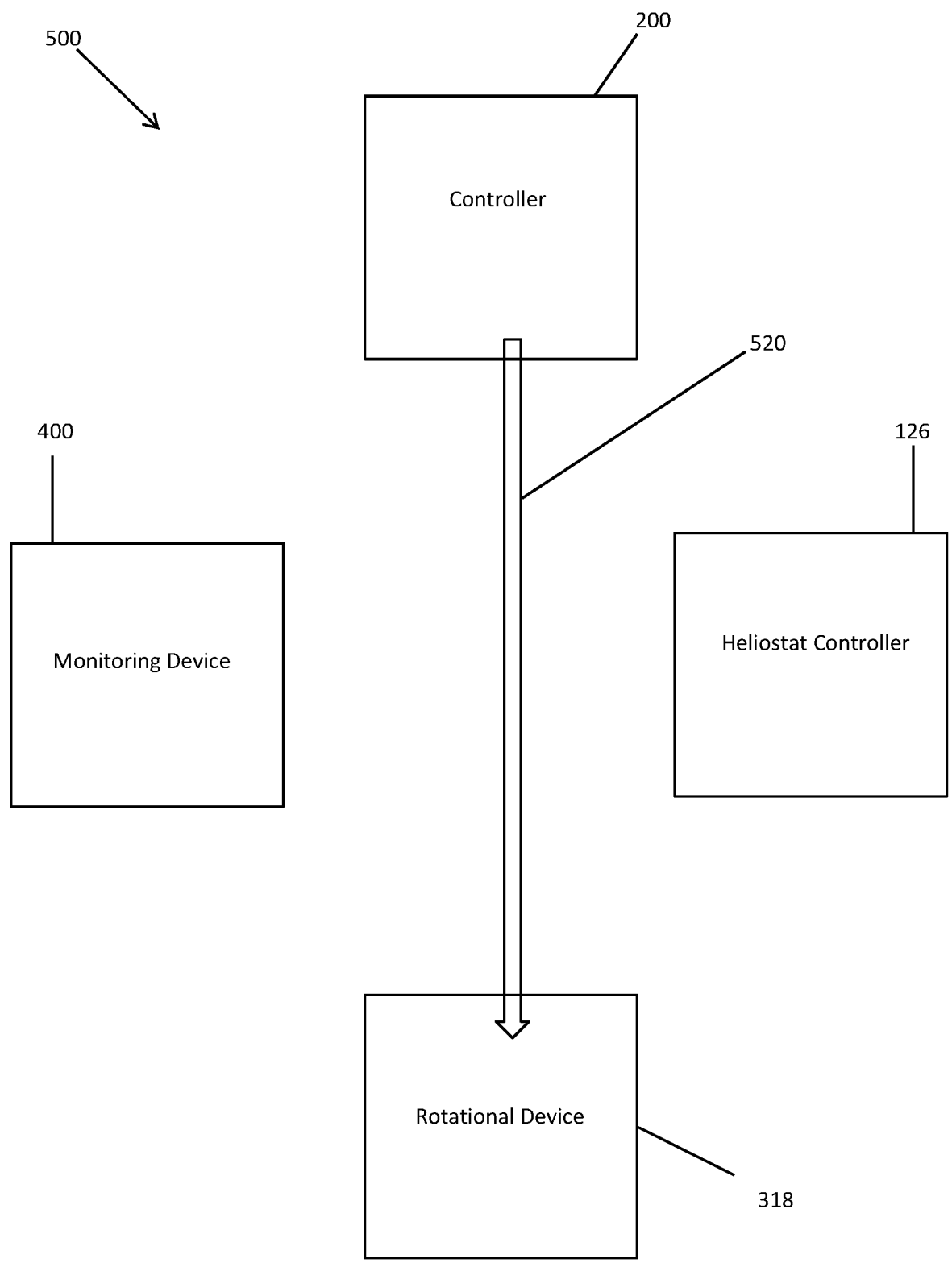
FIG. 5j is a block diagram of a system, in accordance with one embodiment.

As shown in FIGS. 1C and 1D, the heliostat system 120, having at least one heliostat, can have multiple flat or curved reflective surfaces 122A-H. The reflective surfaces 122A-H are coupled to one or more motors 124A-H. The motors 124A-H are coupled to a heliostat controller 126. The heliostat controller 126 can control the motors 124A-H to steer or otherwise move selective ones of the reflective surfaces 122A-H so that a portion of the incident radiant energy 102 is reflected radiant energy 112 and is directed toward and, optionally concentrated in a target area 116 on the heated object 114. The target area 116 is the radial area from the axis of rotation of the heated object 114 between a first radial position 116a from the axis of rotation of the heated object 114 and a second radial position 116b from the axis of rotation of the heated object 114, both first radial position 116a and second radial position 116b measured from the target area start position 116c. The target area 116 can be defined as radial degrees from the axis of rotation of the heated object 114, as incremental rotational steps from the axis of rotation of the heated object 114, or the like. For example, without limitation, as shown in FIG. 4, where the first radial position 116a and second radial position 116b are defined in terms of degrees, the first radial position 116a is 225° and the second radial position 116b is 315° thereby defining the target area 116 as between 225° and 315°. The heliostat controller 126 can be configured to receive and/or transmit information related to the amount of reflected radiant energy 112 directed toward the heated object 114. The heated object 114 can be a hollow object such as a mold for forming plastic products such as storage tanks, water vessels, shipping containers, or the like, drum for roasting agricultural products, or the like.

The heliostat controller 126 can selectively steer each of the reflective surfaces 122A-H individually or in combination. The reflective surfaces 122A-H can concentrate the reflected radiant energy 112 on the affected portion 114b of the heated object 114.

Figure 2A:
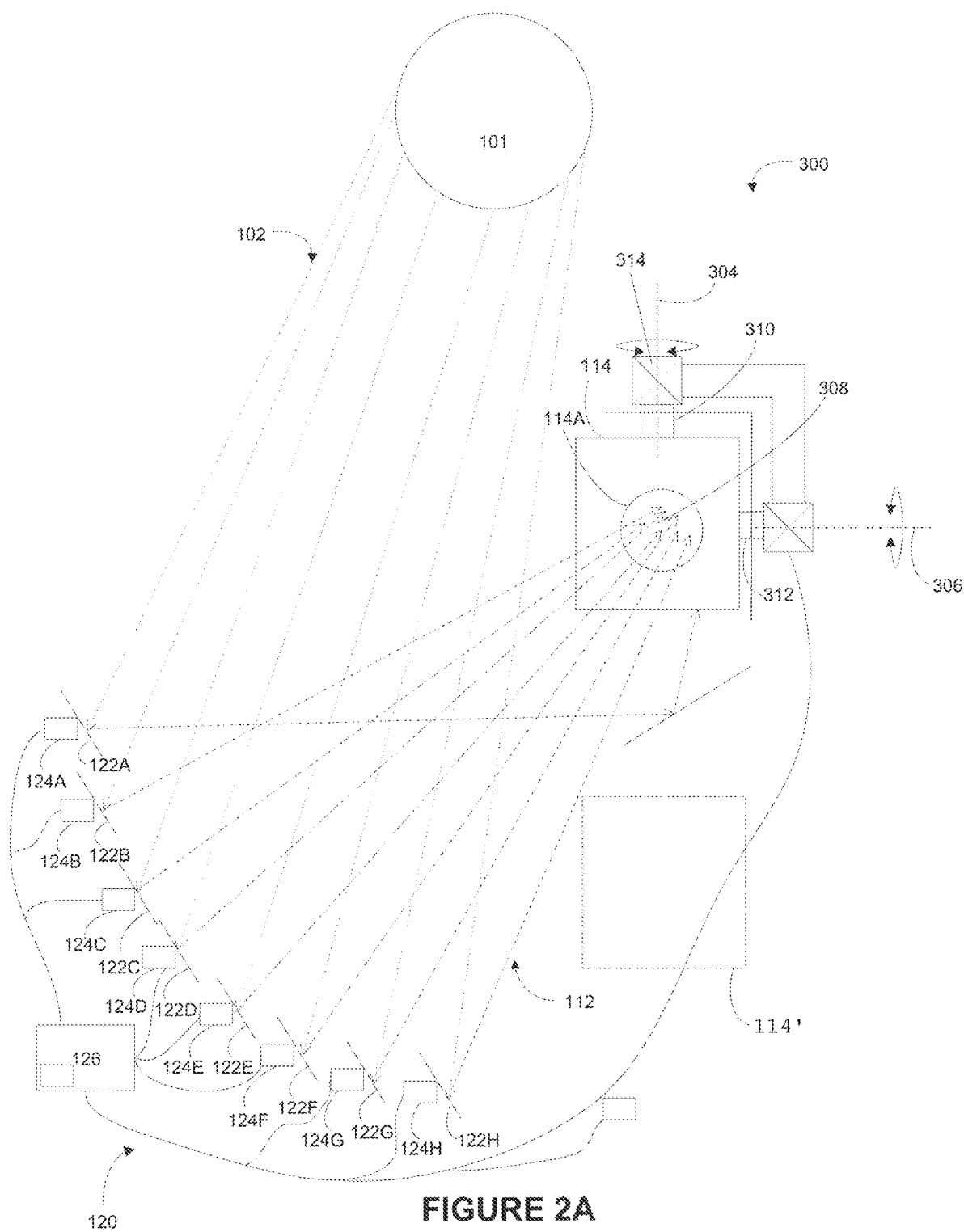
FIG. 2A is a schematic diagram of a solar rotational manufacturing system, in accordance with one embodiment.
Figure 2B:
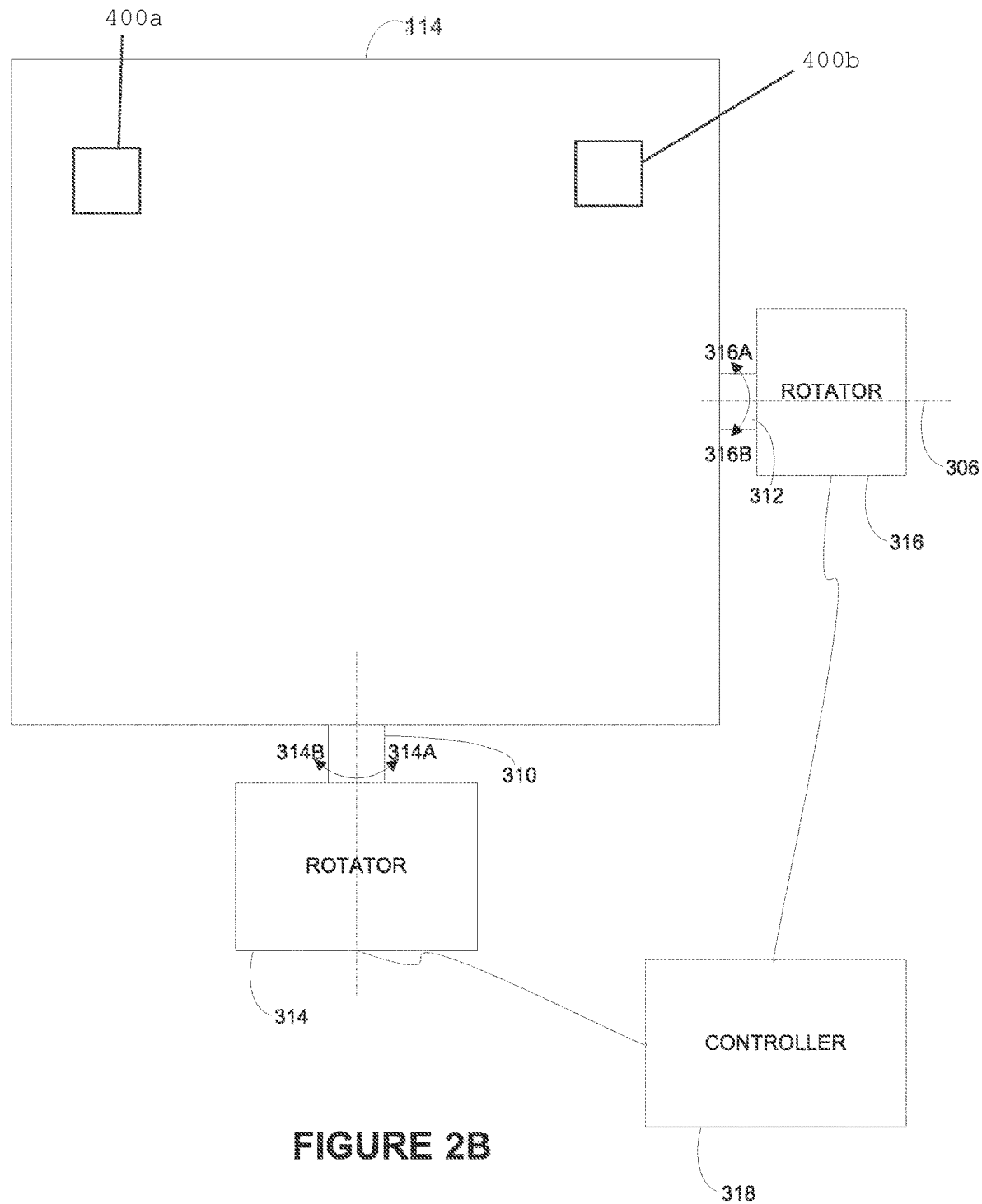
FIG. 2B is a schematic diagram of a rotational apparatus, in accordance with one embodiment.

In one embodiment, as shown in FIGS. 2A & 2B, the system 100 can have a rotational apparatus 300 configured to rotate the heated object 114. The rotational apparatus 300 can be configured to rotate on at least two axes 304 and 306. It should be understood that the rotational apparatus 300 could also be rotational in a third axis 308 (e.g., perpendicular with the surface of the drawing) with minor modification to the concept. However to simplify the discussion and description only two axis 304 and 306 is discussed. Alternatively, the heated object 114, can be moved to second location 114', away from the focal point 114A of the collected, reflected radiant energy 112.

The rotational apparatus 300 includes a first rotator 314 for rotating the heated object 114 on the first axis 304 in directions 314A, 314B. The first rotator 314 is coupled to the heated object 114 by the shaft 310. The rotational apparatus 300 includes a second rotator 316 for rotating the heated object 114 on the second axis 306 in directions 316A, 316B. The second rotator 316 is coupled to the heated object 114 by the shaft 312. The first rotator 314 and the second rotator 316 can be any suitable rotational mechanism. The rotational apparatus 300 can have a rotational controller 318 configured to receive and/or transmit information related to the rotation of the rotational apparatus 300.

In one embodiment, the solar rotational manufacturing system 100 can have a controller 200. The controller 200 is configured to alter a component or characteristic of the solar rotational manufacturing system 100 that affects the manufacturing process of the product. In one embodiment, the solar rotational manufacturing system 100 can have a controller 200, heliostat controller 126, rotational controller 318, or any combinations thereof connected over network. Each of the controllers 200, 126, 318 can be a computing device that can be a standalone device, a server, a laptop computer, a tablet computer, a netbook computer, a personal computer (PC), a desktop computer, a personal digital assistant (PDA), a smart phone, or any programmable electronic device capable of communicating with controller 200 via network. Controller 200 can be a wearable computer, or electronic devices worn by the user (e.g., as glasses, hats, clothing, accessories, etc.). In another embodiment, controllers 200, 126, 318 represent a computing system utilizing clustered computers and components to act as a single pool of seamless resources. In general, controllers 200, 126, 318 can be any computing device with access to the database. Controllers 200, 126, 318 may include internal and external hardware components.

Database can be stored on controller 200 or may reside on another controller 200, heliostat controller 126, or rotational controller 318, provided that database can access and is accessible by each of software program. In yet other embodiments, database may be stored externally and accessed through a communication network, such as network. Network can be, for example, a local area network (LAN), a wide area network (WAN) such as the Internet, or a combination of the two, and may include wired, wireless, fiber optic or any other connection known in the art. In general, network can be any combination of connections and protocols that will support communications between controllers 200, 126, 318. Database is a data repository that may be written to and read by machine readable program instruction. Database can be implemented with any type of storage device capable of storing data that may be accessed and utilized by controllers 200, 126, 318, such as a database server, a hard disk drive, or a flash memory. In one embodiment, database can represent multiple storage devices within controller 200. Database stores data regarding a heliostat system 120 and/or rotational apparatus 300 may be accessed or view.

Controllers 200, 126, 318 can include a user interface (UI), which includes software, hardware, or a combination thereof. Software of user interface executes locally on the controller 200 and operates to provide a UI to a user of the controller 200. User interface further operates to receive user input from a user via the provided user interface, thereby enabling the user to interact with controller 200. In one embodiment, user interface provides a user interface that enables a user of controller 200 to interact with a software program of the controller 200. In one embodiment, user interface includes software stored on the controller 200. In other embodiments, user interface includes software stored on another computing device.

In some embodiments, user interface is a graphical user interface used to display visuals to a user. For example, in some embodiments, one or both of the input buffer and output buffer are displayed on user interface. In other embodiments, user interface includes one or more interface devices used to enable user interaction with heliostat system 120 and/or rotational apparatus 300. In various embodiments, user interface includes one or more input/output devices, human interface devices, pointing devices, microphone, or the like.

Figure 3:
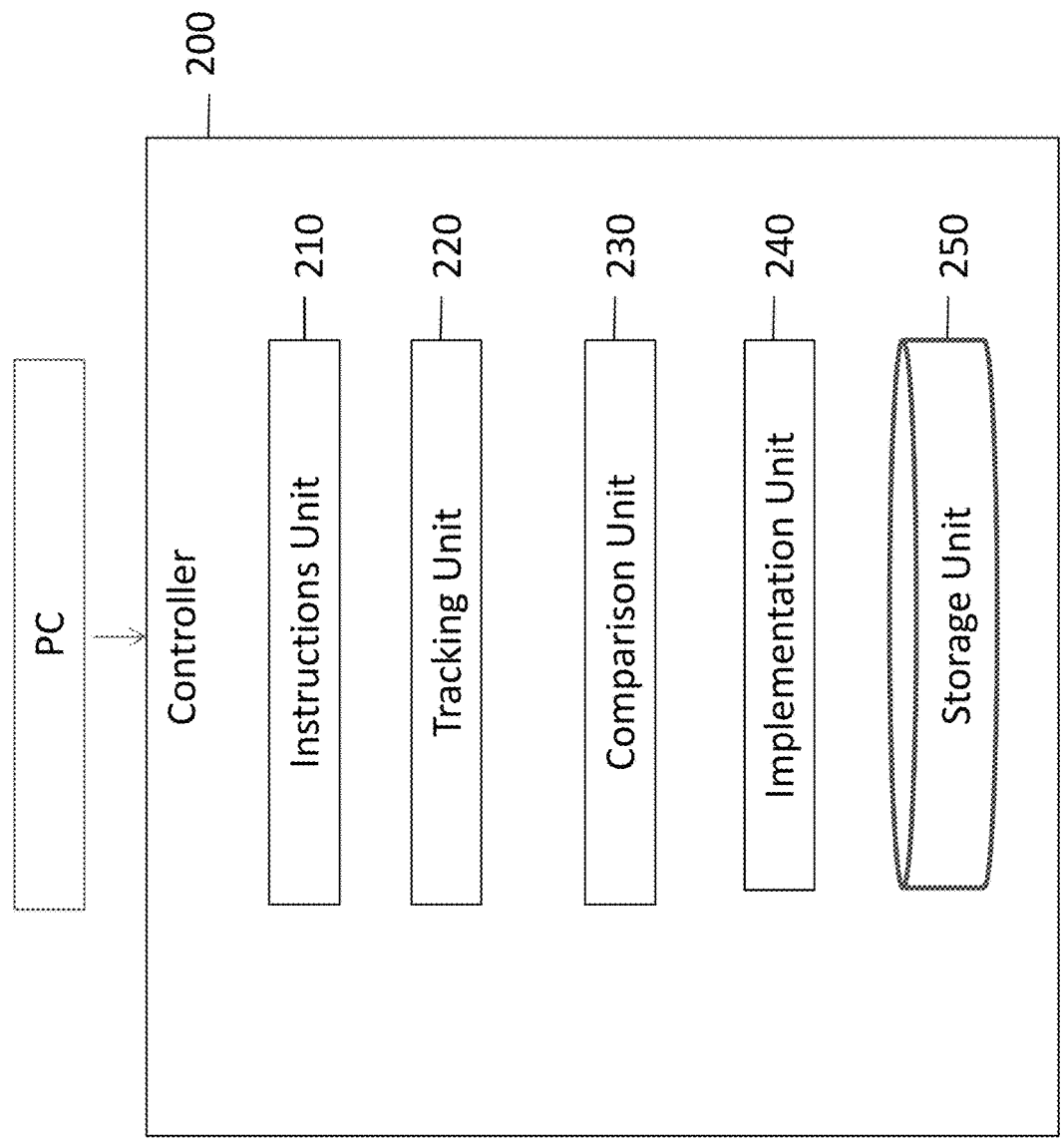
FIG. 3 is a schematic diagram of a controller, in accordance with one embodiment.

The controller 200 executes a control by executing various operations based on instructions from a user, information outputted from each of the sensors, and a program or data stored in the database, or the like. As shown in FIG. 3, the controller 200 can have an instructions unit 210, a tracking unit 220, a comparison unit 230, an implementation unit 240, a storage unit 250, or any combination thereof. In other words, the controller 200 operates based on the program stored in the storage unit 250 and serves as the instructions unit 210, tracking unit 220, comparison unit 230, and an implementation unit 240.

In one embodiment, the instructions unit 210 is configured to receive affecting instructions 510 from a user. The affecting instructions 510 can be the instructions used to alter a component or characteristic of the system that affects the manufacturing process of the product. The affecting instructions 510 can have information regarding the reference parameters 512, the affecting parameters 514, linking instructions 516, or any combination thereof.

In one embodiment, the user interface of the controller 200 can be configured to receive the reference parameters 512 from a user, such as by inputting a reference parameter 512 into the user interface. Reference parameters 512 can be any information or data associated with a component characteristic of the solar rotational manufacturing system 100. Reference parameters 512 can be used to determine whether or not to alter the affecting parameters 514. The reference parameters 512 may be determined based on the results of experiments, simulations, or the like. The reference parameters 512 can have a value or range of values related to a component or characteristic of the solar rotational manufacturing system 100. A reference parameter 512 can be, for example, without limitation, any information or data related to a characteristic of the heated object 114, for example, without limitation, position, temperature, pressure, rotational velocity, rotational acceleration, or the like, any information or data related to a characteristic of the product, for example, without limitation, temperature, viscosity, degree of roast, the presence or absence of a chemical in the liquid or gas phase, the presence or absence of $H_2O$ in the liquid or gas phase, or the like, or any information or data related to a characteristic of an affecting device of the solar rotational manufacturing system 100, for example, without limitation, the rotational speed of the rotational apparatus 300, number of heliostats 120 directing reflected radiant energy 112 toward the heated object 114, or the like. An affecting device can be any device or apparatus capable of altering a characteristic of the manufacturing process, for example, without limitation, a rotational apparatus 300, heliostat system 120, or the like. A reference parameter 512 can have a target range and an alteration range. The target range is the desired value or value range related to the reference characteristic. The alteration range can be the value or value range by which is used to alter an affecting parameter 514. For example, without limitation, the target range can be a first value range of the temperature of the heated object 114 and the alteration range can be a second value range of the temperature of the heated object 114.

In one embodiment, the user interface of the controller 200 can be configured to receive the affecting parameters 514 from a user, such as by inputting an affecting parameter 514 into the user interface. Affecting parameters 514 can be any information or data associated with a component or characteristic of the solar rotational manufacturing system 100 that affects the manufacturing process of the product. The affecting parameters 514 can have a value or a range of values related to the component. An affecting parameter 514 can be, for example, without limitation, any information or data related to a characteristic of the heated object 114, for example, without limitation, position, rotational velocity, rotational acceleration, or the like, any information or data related to a characteristic of an affecting device of the solar rotational manufacturing system 100, for example, without limitation, rotational speed of the rotational apparatus 300, number of heliostats 120 directing reflected radiant energy 112 toward the heated object 114, or the like, position of the heliostat flat surface 104, size of the target area 116, or the like. The affecting parameters 514 may be determined based on the results of experiments, simulations, or the like.

In one embodiment, the user interface of the controller 200 can be configured to receive linking instructions 516 from the user, such as by inputting linking instructions 516 into the user interface. Linking instructions 516 can be information instructing the controller 200 to link an affecting parameter 514 with a reference parameter 512. In one embodiment, linking instructions 516 can be information instructing the controller 200 to link an affecting parameter 514 with an alteration range of a reference parameter 512. For example, without limitation, linking instructions 516 can be information instructing the controller 200 to link the affecting parameter 514 of altering the number of heliostats 120 directing reflected radiant energy 112 toward the heated object 114 with reference parameter 512 of the temperature of the heated object 114 falling within the alteration range. By way of another example, without limitation, linking instructions 516 can be information instructing the controller 200 to link the affecting parameter 514 of altering the rotational speed of the heated object 114 with the reference parameter 512 of the affected portion 114b being positioned outside the target area 116. Here, by way of example, the value of the affecting parameter 514 is identified to be executed upon the affected portion 114b being positioned outside the target area 116.

In one embodiment, the solar rotational manufacturing system 100 can have at least one monitoring device 400 configured to monitor and/or collect actual data 518. The solar rotational manufacturing system 100 can have a monitoring device 400 where the system utilizes a closed-loop system. Actual data 518 can be any information or data associated with a component or characteristic of the solar rotational manufacturing system 100. Actual data 518 can be, for example, without limitation, any information or data related to a characteristic of the heated object 114, for example, without limitation, position, temperature, pressure, rotational velocity, rotational acceleration, or the like, any information or data related to a characteristic of the product, for example, without limitation, temperature, viscosity, degree of roast, the presence or absence of a chemical in the liquid or gas phase, the presence or absence of $H_2O$ in the liquid or gas phase, or the like, or any information or data related to a characteristic of an affecting device of the solar rotational manufacturing system 100, for example, without limitation, rotational speed of the rotational apparatus 300, number of heliostats 120 directing reflected radiant energy 112 toward the heated object 114, or the like. The monitoring device 400 can be any device configured to collect actual data 518 and/or communicate actual data 518, for example, without limitation, a sensor configured to collect actual data 518 in relation to position, temperature, viscosity, pressure, degree of roast of an agricultural product, rotational velocity, rotational acceleration, the presence or absence of a chemical in the liquid or gas phase, the presence or absence of $H_2O$ in the liquid or gas phase, or the like. The monitoring device 400 can be, for example, without limitation, a positional sensor 400a, a temperature sensor, an optical sensor, a laser, a motion sensor, an imaging device, a camera, an infrared detector, a volume flow rate sensor, a weight sensor, a sound sensor, a light sensor, a sensor to detect a presence or absence of an object, a chemical sensor used for sensing the presence or absence of a chemical in the liquid or gas phase, water sensor used for sensing the presence or absence of $H_2O$ in the liquid or gas phase, or the like. The monitoring device 400 can collect actual data 518 in real time. The monitoring device 400 can collect actual data 518 a plurality of times at specified intervals. The positional sensor 400a can be any sensor configured to collect and/or transmit positional data regarding the heated object 114, for example, without limitation, a motion control motor, such as an encoder, servo motor, optical sensor, or the like. The positional sensor 400a can be located within the area of the affected portion 114b, such as on the exterior surface or the interior surface area of the affected portion 114b. The temperature monitoring device 400b can be any device capable of determining the temperature related to a mold, for example, without limitation, a temperature sensor, thermal imaging device, or the like. In one embodiment, the temperature monitoring device 400b can be located on the exterior surface of the affected portion 114b or interior surface of the affected portion 114b. The monitoring device 400 can be in communication with the controller 200, for example, through a wired or wireless connection (for example, without limitation, through a data network).

In one embodiment, the monitoring device 400 is configured to transmit actual data 518 and/or estimated data 519 to the controller 200. For example, without limitation, the monitoring device 400 can transmit actual data 518 related to the temperature of the heated object 114 to the controller 200. The actual data 518 can be used to determine whether a characteristic of the heated object 114 is within or outside a reference parameter 512.

In one embodiment, the tracking unit 220 is configured to receive actual data 518 of the heated object 114 transmitted by the monitoring device 400. For example, without limitation, the tracking unit 220 can receive actual data 518 related to the position of the heated object 114 transmitted by a positional sensor 400a positioned on the exterior surface of the heated object 114. By way of another example, without limitation, the tracking unit 220 can receive actual data 518 related to the temperature of the heated object 114 transmitted by a temperature monitoring device 400b.

In one embodiment, the tracking unit 220 can receive estimated data 519 related to the position of the heated object 114 transmitted by a servo motor. The tracking unit 220 can utilize a known starting position and instruct a servo motor to move by known incremental steps, thereby allowing for the tracking unit 220 to estimate the position of the affected portion 114b at any given time. In one embodiment, a limit switch, or the like, can be utilized to indicate when the heated object 114 is in the desired starting position.

In one embodiment, the comparison unit 230 is configured to compare the actual data 518 acquired from the tracking unit 220 with a reference parameter 512 to determine whether the actual data 518 is within or outside the reference parameter 512. In one embodiment, the comparison unit 230 determines whether the actual data 518 is within the target range or alteration range of the reference parameter 512. For example, without limitation, the comparison unit 230 compares the position of the affected portion 114b with the target range and/or alteration range to determine whether or not the position of the affected portion 114b is within the target range of the reference parameter 512.

By way of another example, where the first radial position 116a and the second radial position 116b are defined in terms of incremental steps and a full rotation has 360 incremental steps, the first radial position 116a is 225 incremental steps and the second radial position 116b is 315 incremental steps thereby defining the target area 116 as between 225 incremental steps and 315 incremental steps. The affected portion 114b of the heated object 114 receives the impinging reflected radiant energy 112. The affected portion 114b can be any location on the surface of the heated object 114, for example, a face, surface, such as a flat or undulated surface, portion of a surface, corner, edge, or the like. In one embodiment, the affected portion 114b is the radial area from the axis of rotation of the heated object 114 between a first radial position 115a from the axis of rotation of the heated object 114 and the second radial position 115b from the axis of rotation of the heated object 114, both first radial position 115a and second radial position 115b measured from the affected portion start position 115c.

By way of another example, without limitation, where the target area 116 is identified between 225° and 315°, the affected portion 114b is identified between 112.5° and 157.5°, and the affected portion 114b is positioned in relation to the target area 116, as shown in FIG. 3, the comparison unit 230 determines that the position of the affected portion 114b is within the target area 116.

By way of another example, the comparison unit 230 compares the actual temperature of the affected portion 114b with the target range and/or alteration range of the reference temperature of the affected portion 114b to determine whether the actual temperature of the affected portion 114b is within the target range or alteration range of the reference temperature of the affected portion 114b.

In one embodiment, the comparison unit 230 is configured to determine at least one affecting parameter 514 to alter. In one embodiment, the comparison unit 230 determines an affecting parameter 514 to alter by identifying the affecting parameter 514 linked to the reference parameter 512. For example, without limitation, where the affected portion 114b is positioned within the positional range of the alteration range of the reference parameter 512, the comparison unit 230 determines the affecting parameter 514 of altering the rotational speed of the heated object 114 as the affecting parameter 514. By way of another example, where the actual temperature of the affected portion 114b is within the temperature range of the alteration range of the reference temperature, the comparison unit 230 determines the affecting parameter 514 of altering the rotational speed of the heated object 114 as the affecting parameter 514. Specifically, where the actual temperature of the affected portion 114b is 510°, the alteration range temperature range of the affected portion 114b is greater than 500°, and the affecting parameter 514 linked to the alteration range is the rotational speed of the heated object 114 at 3 RPM, the comparison unit 230 determines the affecting parameter 514 as a rotational speed of the affected portion 114b at 3 RPM.

In one embodiment, the implementation unit 240 is configured to transmit alteration instructions 520 to an affecting device of the solar rotational manufacturing system 100. Alteration instructions 520 can have information instructing an affecting device of the solar rotational manufacturing system 100 to alter, for example, without limitation, increase or decrease, the value of the determined affecting parameter 514. For example, without limitation, where the comparison unit 230 determines that the affecting parameter 514 is the rotational speed of the heated object 114, the implementation unit 240 can transmit alteration instructions 520 having information instructing the rotational controller 318 to alter the value of the rotational speed and/or rotational direction of the heated object 114. Specifically, where the comparison unit 230 determines the affecting parameter 514 as the rotational speed of the heated object 114 at 3 RPM, the implementation unit 240 transmits alteration instructions 520 to the rotational controller 318 instructing the rotational apparatus 300 to alter the rotational speed of the heated object 114 to 3 RPM.

In one embodiment, the implementation unit 240 is configured to transmit continuation instructions 522 to an affecting device of the solar rotational manufacturing system 100. Continuation instructions 522 can have information instructing an affecting device of the solar rotational manufacturing system 100 to continue using the value of an affecting parameter 514. Continuation instructions 522 can be transmitted upon a determination by the comparison unit 230 that the actual data 518 is within the target range of the reference parameter 512. For example, without limitation, where the comparison unit 230 determines that the actual data 518 related to the temperature of the heated object 114 is within the target range of the reference parameter 512 related to the temperature of the heated object 114, the implementation unit 240 transmits continuation instructions 522 to the heliostat controller 126 to continue directing reflected radiant energy 112 from the same number of heliostats 120 toward the heated object 114.

The storage unit 250 is configured to store various values of or related to the actual data 518, reference parameters 512, and affecting parameters 514, for example, without limitation, positional data such as the position of the heated object 114, temperature, viscosity, pressure, degree of roast of an agricultural product, rotational speed, the presence or absence of a chemical in the liquid or gas phase, the presence or absence of $H_2O$ in the liquid or gas phase, the reference parameters 512 linked to the affecting parameters 514, the like, or a program for operating the instructions unit 210, the tracking unit 220, comparison unit 230, implementation unit 240, or the like.

The controller 200, heliostat system 120, rotational apparatus 300, and/or monitoring device 400, can have receivers and/or transmitters. The receivers can be configured to receive instructions and/or data from a corresponding device, such as the controller 200, heliostat system 120, rotational apparatus 300, and/or monitoring device 400. For example, without limitation, a receiver can allow the controller 200 to receive data from the monitoring device 400. The transmitters can be configured to transmit instructions and/or data from a corresponding device, such as a controller 200, heliostat system 120, rotational apparatus 300, and/or monitoring device 400. For example, without limitation, a transmitter can allow the controller 200 to transmit instructions to the rotational apparatus 300. The receivers and/or transmitters, and the devices corresponding thereto, can be configured to communicate over a wired connection or over a wireless connection, such as via Ethernet, LAN, WAN, Bluetooth, WiFi, IR communication, or the like.

In one embodiment, the affecting device is configured to receive alteration instructions and/or continuation instructions. For example, without limitation, alteration instructions 520 instructing the affecting device to increase the rotational speed of the rotational apparatus 300 are received by the affecting device.

In one embodiment, the affecting device is configured to execute the alteration instructions and/or continuation instructions. For example, without limitation, the alteration instructions 520 instructing the affecting device to increase the rotational speed of the rotational apparatus 300 are executed by the affecting device, thereby altering the amount of heat received by the affected portion 114b during a specific amount of time.

Figure 6:
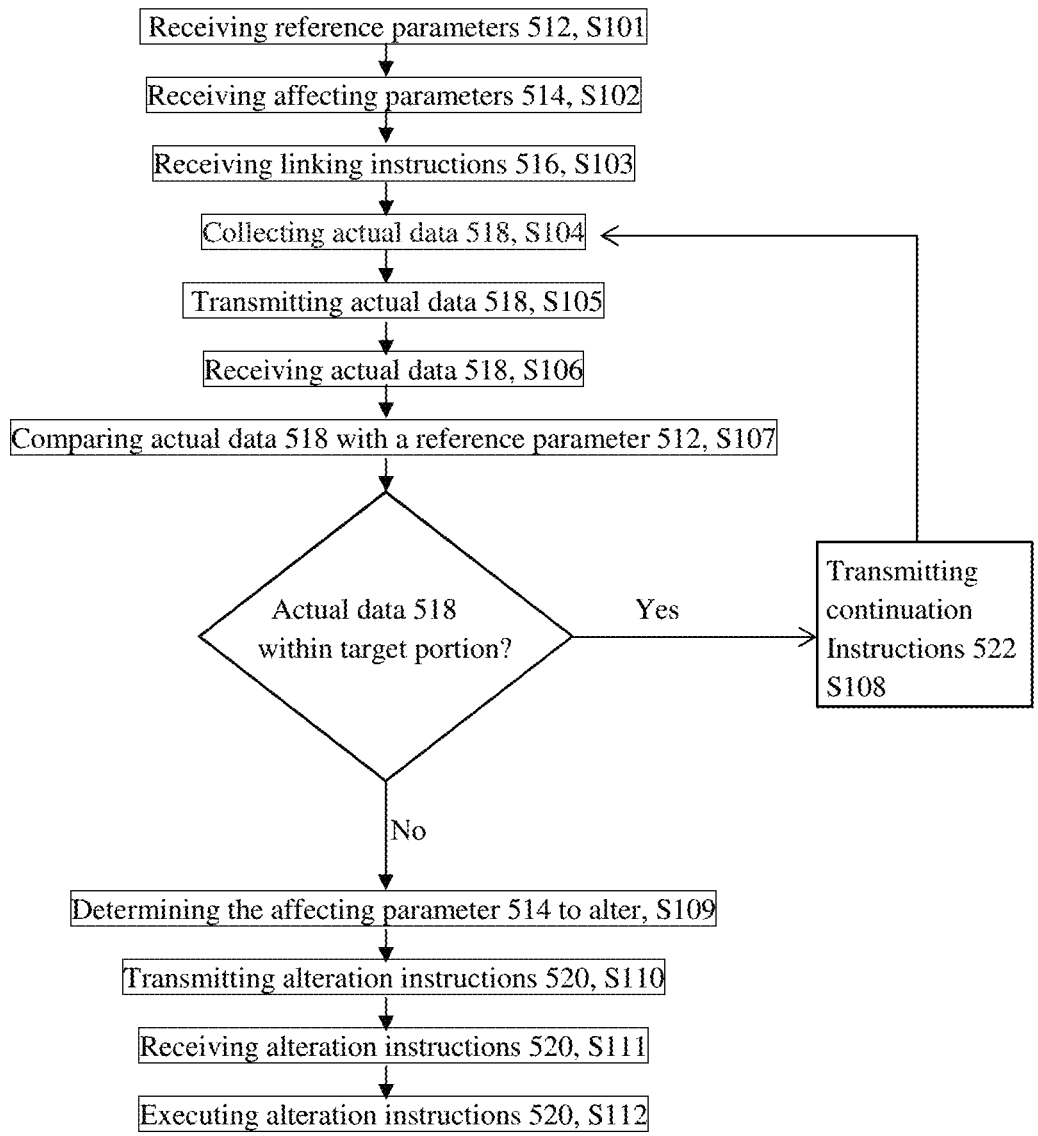
FIG. 6 is a flow chart of a method, in accordance with one embodiment.

In one embodiment, as shown in FIG. 6, a method of manufacturing a product can include the steps of receiving the reference parameters 512, receiving the affecting parameters 514, receiving the linking instructions 516, collecting actual data 518, transmitting the collected actual data 518, receiving the collected actual data 518, comparing the actual data 518 with the reference parameter 512, determining whether the actual data 518 is within the reference parameter, target range, alteration range, or any combination thereof, transmitting continuation instructions 522, determining an affecting parameter 514 to alter, transmitting alteration instructions 520, receiving alteration instructions 520, executing alteration instructions 520, or any combinations thereof. In one embodiment, the steps of the method of manufacturing a product, for example, without limitation, receiving the reference parameters 512, receiving the affecting parameters 514, receiving the linking instructions 516, receiving the collected actual data 518, comparing the actual data 518 with the reference parameter 512, determining whether the actual data 518 is within the reference parameter, target range, alteration range, or any combination thereof, transmitting continuation instructions 522, determining an affecting parameter 514 to alter, transmitting alteration instructions 520, or any combinations thereof, can be performed by the controller 200.

As shown in FIG. 6, in one embodiment, in Step S101, the reference parameters 512 are received by the controller 200. In one embodiment, the target range and/or alteration range of the reference parameters 512 are received by the controller 200. For example, without limitation, the target range and alteration range of the reference parameter 512 related to the temperature range of the heated object 114 during the manufacturing process is received by the controller 200 by the user inputting the target range and alteration range of the reference parameter 512 into the user interface.

In one embodiment, as in Step S102, the affecting parameters 514 are received by the controller 200. For example, without limitation, the affecting parameter 514 related to the number of heliostats 120 directing reflected radiant energy 112 toward the heated object 114 is received by the controller 200 by the user inputting the affecting parameter 514 into the user interface.

In one embodiment, as in Step S103, the linking instructions 516 are received by the controller 200. For example, without limitation, the linking instructions 516 instructing the controller 200 to link the alteration range of the reference parameter 512 related to the temperature of the heated object 114 with the affecting parameter 514 of the number of heliostats 120 directing reflected radiant energy 112 toward the heated object 114 are received by the controller 200 by the user inputting linking instructions 516 into the user interface.

In one embodiment, as in Step S104, actual data 518 related to a component or characteristic of the manufacturing process is collected by a monitoring device 400. For example, without limitation, actual data 518 in relation to the temperature of the heated object 114 is collected by the monitoring device 400.

In one embodiment, in Step S105, the collected actual data 518 related to a component or characteristic of the manufacturing process is transmitted by the monitoring device 400 to the controller 200. For example, without limitation, the collected actual data 518 related to the temperature of the heated object 114 is transmitted by a temperature monitoring device 400b to the controller 200.

In one embodiment, as in Step S106, the actual data 518 related to a component or characteristic of the manufacturing process is received by the controller 200 from the monitoring device 400. For example, without limitation, the actual data 518 in relation to the temperature of the heated object 114 is received by the controller 200 from the temperature monitoring device 400b.

In one embodiment, the actual data 518 is compared with the reference parameters 512 by the controller 200 to determine whether the actual data 518 is within the target range and/or alteration range of the reference parameters 512. In one embodiment, as in Step S107, the actual data 518 is compared with the target range and/or alteration range of the reference parameter 512 by the controller 200. For example, without limitation, the actual data 518 related to the temperature of the heated object 114 is compared with the target range and alteration range of the reference parameter 512 related to the temperature of the heated object 114 by the controller 200.

In one embodiment, where it is determined that the actual data 518 is within the target range of the reference parameter 512, as in Step S108, the continuation instructions 522 are transmitted by the controller 200 to an affecting device. For example, without limitation, where the actual data 518 related to the inside temperature of the heated object 114 is within the target range, continuation instructions 522 instructing the heliostat controller 126 to continue with the same number of heliostats 120 directing reflected radiant energy 112 toward the heated object 114 are transmitted by the controller 200 to the heliostat controller 126.

In one embodiment, where it is determined by the controller 200 that the actual data 518 is within the alteration range of the reference parameter 512, as in Step S109, an affecting parameter 514 to alter is determined by the controller 200. In one embodiment, the affecting parameter 514 to alter can be determined by the controller 200 by identifying the affecting parameter 514 linked to the reference parameter 512. For example, without limitation, where the alteration range of the reference parameter 512 related to the temperature of the heated object 114 is linked with the affecting parameter 514 of the number of heliostats 120 directing reflected radiant energy 112 toward the heated object 114, the affecting parameter 514 of the number of heliostats 120 directing reflected radiant energy 112 toward the heated object 114 is determined by the controller 200.

In one embodiment, as in Step S110, alteration instructions 520 are transmitted by the controller 200 to an affecting device. For example, without limitation, the alteration instructions 520 instructing the affecting device to alter the number of heliostats 120 are transmitted by the controller 200 to the heliostat controller 126.

In one embodiment, as in Step S111, the alteration instructions 520 are received by the affecting device from the controller 200. For example, without limitation, the alteration instructions 520 instructing the affecting device to alter the number of heliostats 120 are received by the heliostat controller 126 from the controller 200.

In one embodiment, as in Step S112, the alteration instructions 520 are executed by the affecting device. For example, without limitation, the alteration instructions 520 instructing the affecting device to alter the number of heliostats 120 are executed by the heliostat controller 126 thereby altering the number of heliostats 120 directing reflected radiant energy 112 toward the heated object 114. In this way, by way of example, the number of heliostats 120 directing reflected radiant energy 112 toward the heated object 114 can be decreased, and thus, the amount of reflected energy impinging on the affected portion 114b of the heated object 114 is decreased thereby decreasing the temperature of the heated object 114. By way of another example, the target 114, can be moved to second location 114', away from the focal point 114A of the collected, reflected radiant energy 112. This can result in the product within the heated object 114 being heated in a manner that allows for a more uniform heating of the product inside the heated object 114.

Although a few implementations have been described in detail above, other modifications are possible. In addition, the logic flows depicted in the figures do not, require the particular order shown, or sequential order, to achieve desirable results. In addition, other steps may be provided, or steps may be eliminated, from the described flows, and other components may be added to, or removed from, the described systems.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A solar rotational manufacturing system comprising:
   a monitoring device,
   a controller,
   a heliostat having a heliostat controller,
   a rotational apparatus having a rotational controller, and
   a container, the rotational apparatus engages the container wherein:
   the monitoring device is configured to collect actual data regarding a characteristic of the solar rotational heating system and transmit actual data to the controller,
   the controller is configured to receive a reference parameter, an affecting parameter,
   and linking instructions, receive actual data of the container from the monitoring device, compare actual data of the container with a reference parameter, determine an affecting parameter to alter, and transmit alteration instructions to the heliostat controller and/or the rotational controller,
   the heliostat controller is configured to receive the alteration instructions from the controller and execute the alteration instructions, and
   the rotational controller is configured to receive the alteration instructions from the controller and execute the alteration instructions,
   wherein the reference parameter is a characteristic of the container.

2. The system of claim 1 wherein the controller is configured to determine an affecting parameter to alter by identifying the affecting parameter linked to the reference parameter.

3. The system of claim 1 wherein the controller is configured to transmit continuation instructions to the heliostat controller and/or the rotational controller.

4. The system of claim 1 wherein the monitoring device is selected from the group consisting of a positional sensor, a temperature sensor, a viscosity sensor, a pressure sensor, or a rotational velocity sensor.

5. The system of claim 1 wherein the reference parameter comprises a target range and an alteration range, wherein the target range is a value range by which an affecting parameter is not triggered upon the value of the actual data being within the target range.

6. The system of claim 5 wherein the step of comparing actual data with a reference parameter comprises determining whether the value of the actual data falls within the value range of the target range.

7. The system of claim 5 wherein the alteration range is a value range by which an affecting parameter is triggered upon the value of the actual data being within the alteration range.

8. The system of claim 7 wherein the step of comparing actual data with a reference parameter comprises determining whether the value of the actual data falls within the value range of the alteration range.

9. The system of claim 1 wherein the affecting parameter is a characteristic of the container.

10. A method for manufacturing a product, the method comprising:
    by a monitoring device: collecting actual data of a container regarding a characteristic of a solar rotational heating system and transmitting actual data of container to a controller,
    by the controller: receiving a reference parameter, an affecting parameter, and linking instructions, receiving actual data of the container from the monitoring device, comparing actual data of the container with a reference parameter, determining an affecting parameter to alter, and transmitting alteration instructions to a heliostat controller and/or a rotational controller, by a heliostat controller: receiving the alteration instructions from the controller and executing the alteration instructions, and by a rotational controller: receiving the alteration instructions from the controller and executing the alteration instructions, wherein the reference parameter is a characteristic of the container and wherein rotational apparatus engages the container.

11. The method of claim 10 further comprising, by the controller, determining an affecting parameter to alter by identifying the affecting parameter linked to the reference parameter.

12. The method of claim 10 further comprising, by the controller, transmitting continuation instructions to the heliostat controller and/or the rotational controller.

13. The method of claim 10 wherein the monitoring device is selected from the group consisting of a positional sensor, a temperature sensor, a viscosity sensor, a pressure sensor, a rotational velocity sensor, or a rotational acceleration sensor.

14. The method of claim 10 wherein the reference parameter comprises a target range and an alteration range wherein the target range is a value range by which an affecting parameter is not triggered upon the value of the actual data being within the target range.

* * * * *